(12) United States Patent
Nakamura et al.

(10) Patent No.: US 7,798,537 B2
(45) Date of Patent: Sep. 21, 2010

(54) COUPLING APPARATUS

(75) Inventors: Tetsuya Nakamura, Tokyo (JP); Akira Horimoto, Nasushiobara (JP); Kazuyuki Tamada, Nasushiobara (JP)

(73) Assignee: Sakura Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/411,682

(22) Filed: Mar. 26, 2009

(65) Prior Publication Data
US 2009/0184518 A1    Jul. 23, 2009

Related U.S. Application Data

(63) Continuation of application No. PCT/JP2006/320335, filed on Oct. 11, 2006.

(51) Int. Cl.
*F16L 21/00*    (2006.01)

(52) U.S. Cl. .................. 285/401; 285/415; 285/376

(58) Field of Classification Search ................ 285/361, 285/360, 401, 391, 392, 415, 414, 73, 376
See application file for complete search history.

(56) References Cited

U.S. PATENT DOCUMENTS

|  |  |  |  |  |
|---|---|---|---|---|
| 658,863 | A * | 10/1900 | Pfeffer | 285/337 |
| 1,794,905 | A * | 3/1931 | Kass | 285/354 |
| 2,142,452 | A * | 1/1939 | Merrill | 285/189 |
| 4,097,069 | A * | 6/1978 | Morrill | 285/84 |
| 4,183,560 | A * | 1/1980 | Wyss | 285/232 |
| 5,857,713 | A * | 1/1999 | Horimoto | 285/81 |
| 6,382,680 | B1 * | 5/2002 | Horimoto | 285/81 |
| 7,243,953 | B2 * | 7/2007 | Nakamura et al. | 285/82 |
| 7,341,281 | B2 * | 3/2008 | Guesnon et al. | 285/81 |
| 7,481,467 | B2 * | 1/2009 | Horimoto et al. | 285/377 |

FOREIGN PATENT DOCUMENTS

| JP | 9-119577 | 5/1997 |
|---|---|---|
| JP | 2002-39475 | 2/2002 |
| JP | 2003-106491 | 4/2003 |
| JP | 2005-83433 | 3/2005 |

OTHER PUBLICATIONS

International Search Report for PCT/JP2006/320335 mailed Nov. 7, 2006.

* cited by examiner

*Primary Examiner*—David E Bochna
(74) *Attorney, Agent, or Firm*—Nixon & Vanderhye P.C.

(57) ABSTRACT

A coupling apparatus includes projections projecting axially from circumferential positions on a distal part of an annular body, each projection having an engaging hook projecting in one circumferential direction at an end part thereof. The body and the projections are formed independently of each other, and the apparatus includes a fixing structure for fixing the projections to the positions on the distal part. After inner peripheries of the projections are placed on the outer periphery of the distal part adjacent to an outward overhang, the fixing structure is detachably fixed on the outer periphery in a side of the projections axially opposing to the overhang and has an inward tapering surface fitted on an outward tapering surface of each projection to fix the projections at the predetermined positions on the outer periphery, and includes a cutout exposing the outward tapering surface of at least one projection.

17 Claims, 16 Drawing Sheets

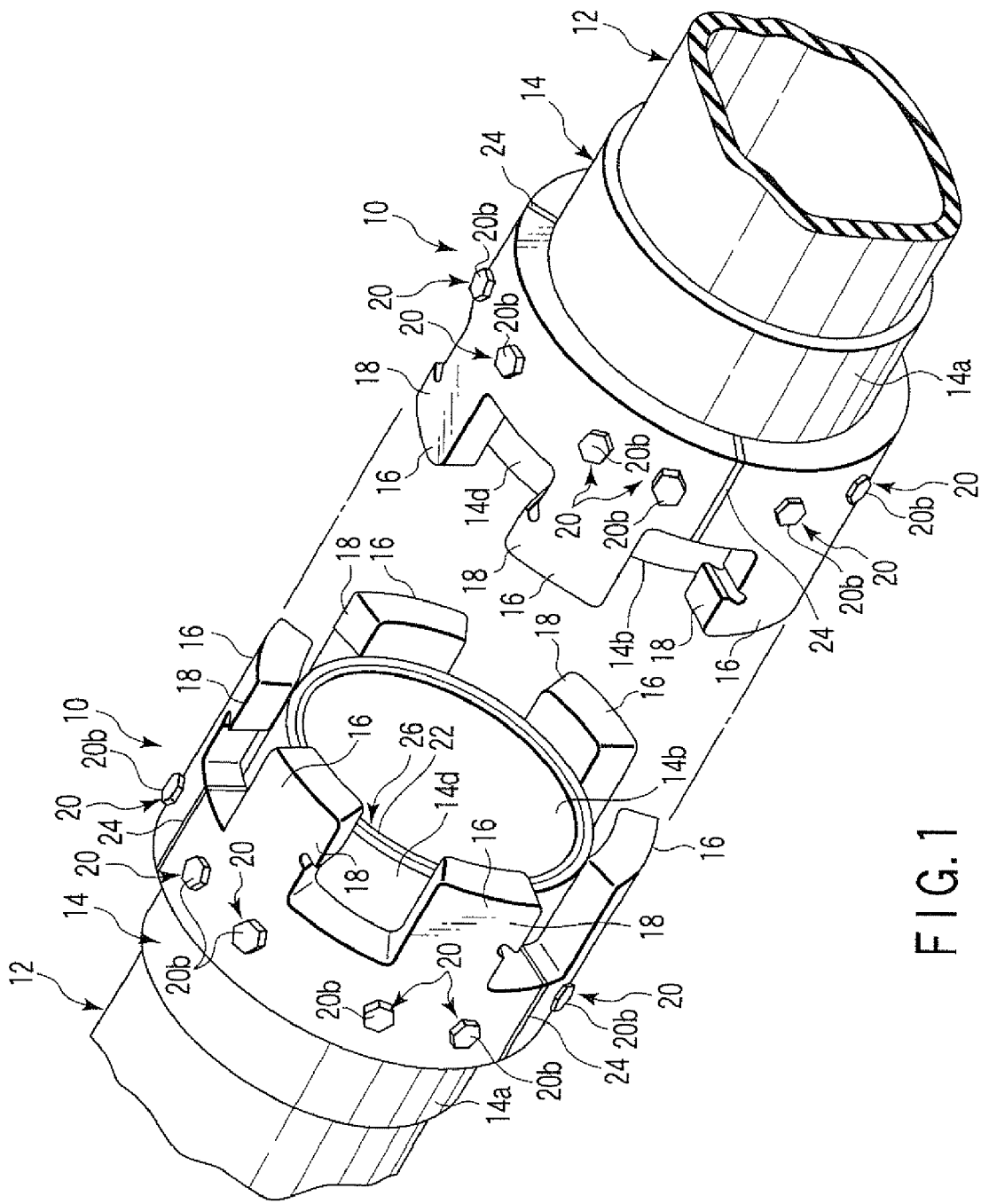
F I G. 1

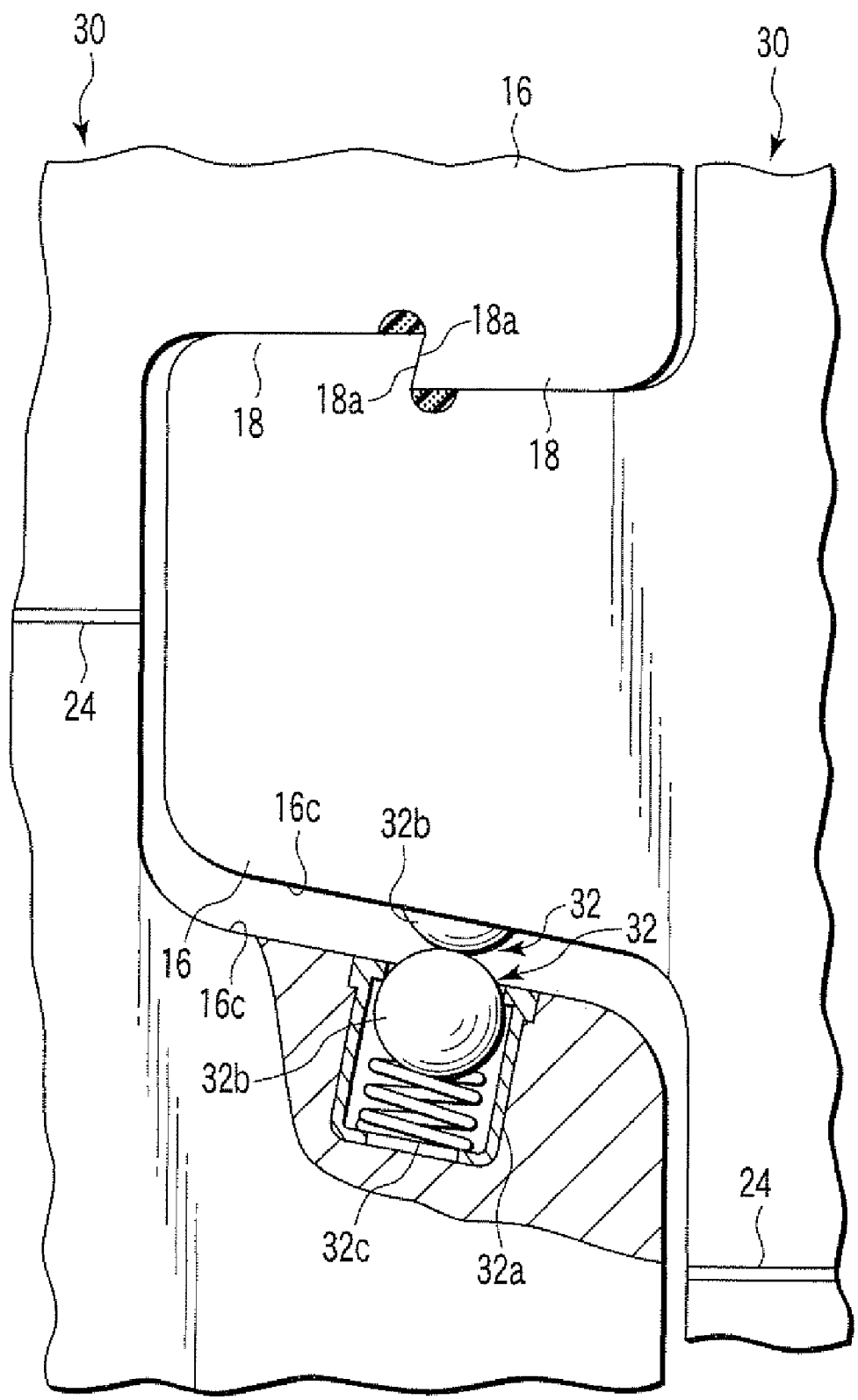
F I G. 6

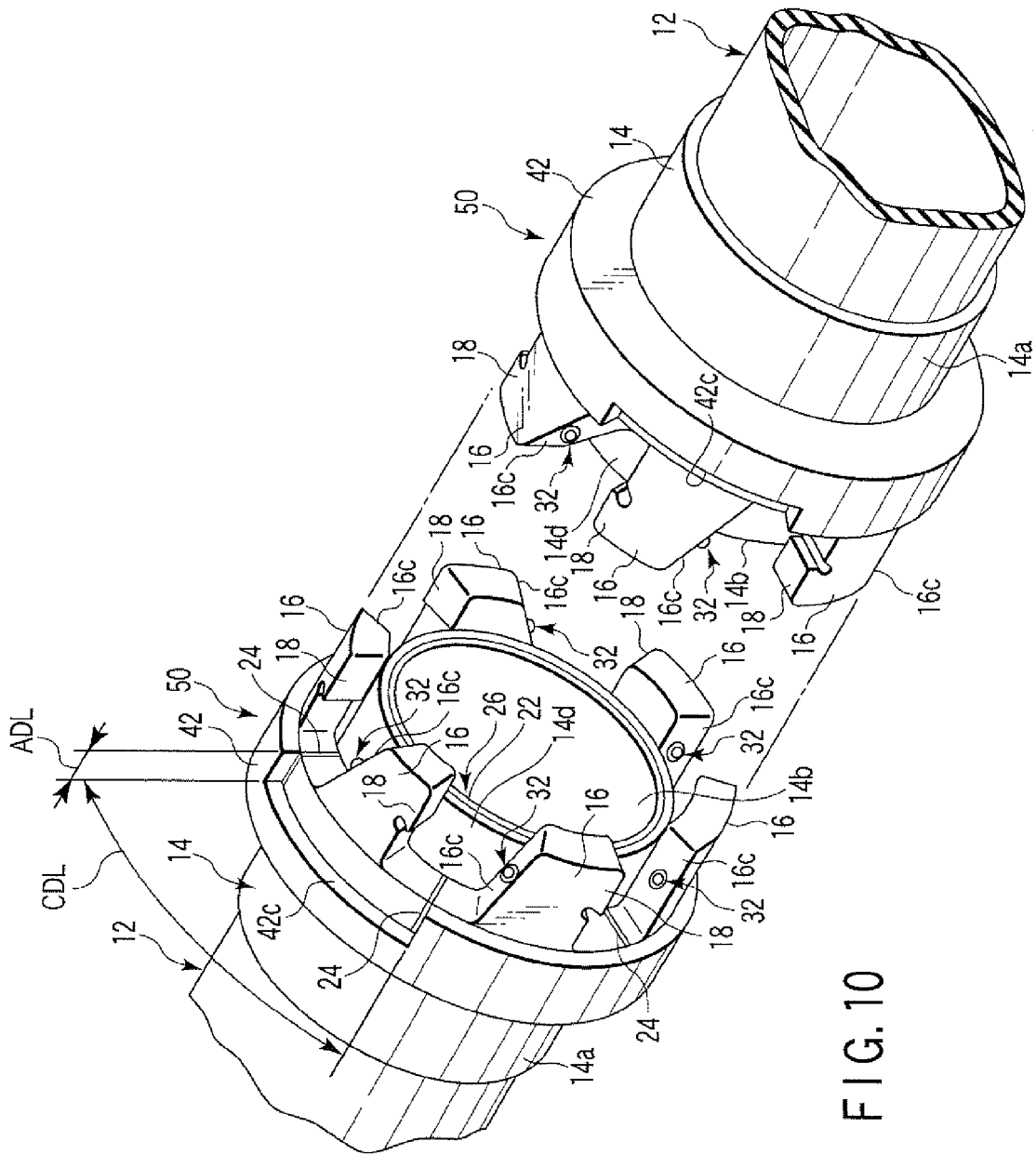
F I G. 10

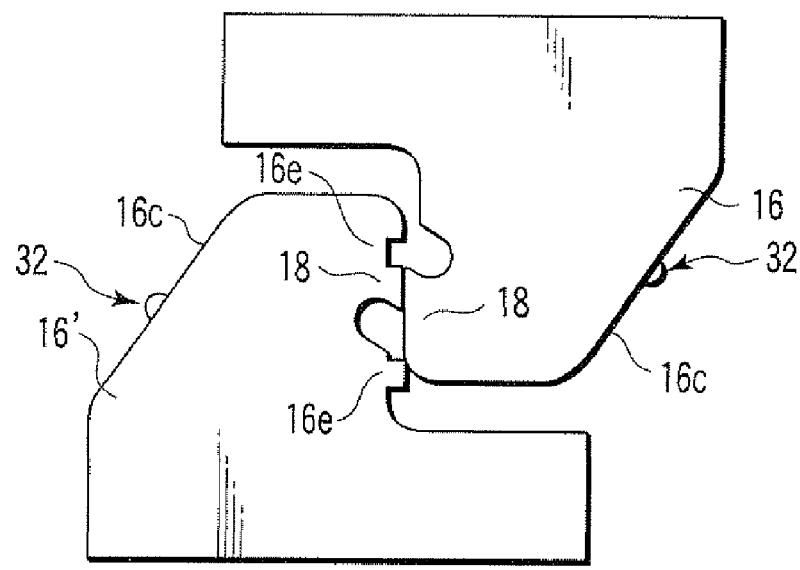
F I G. 13A
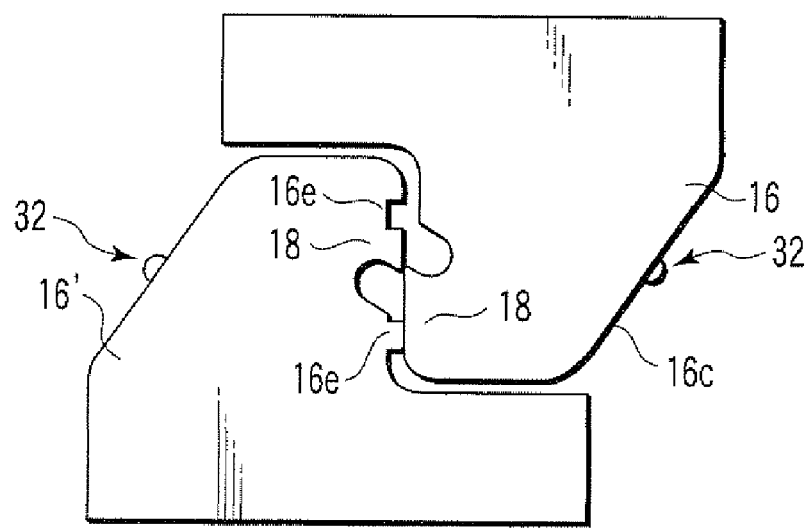
F I G. 13B

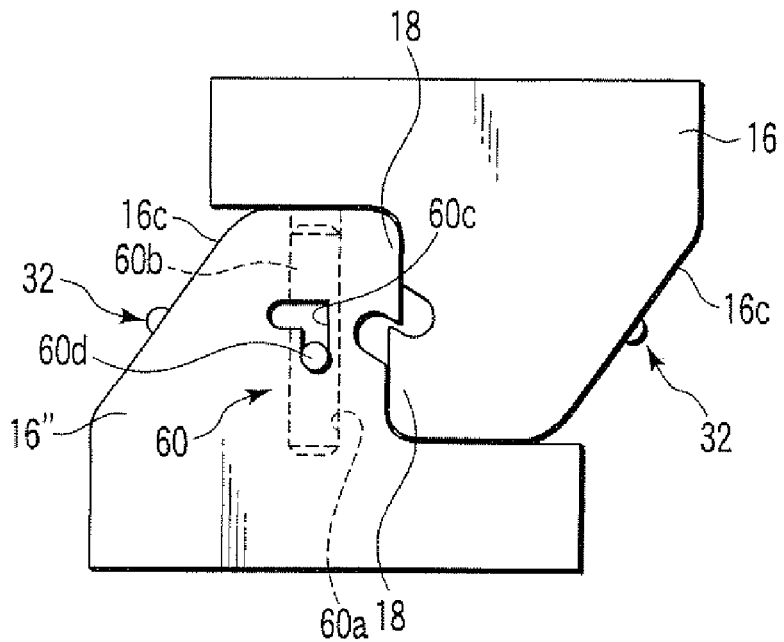
F I G. 15A
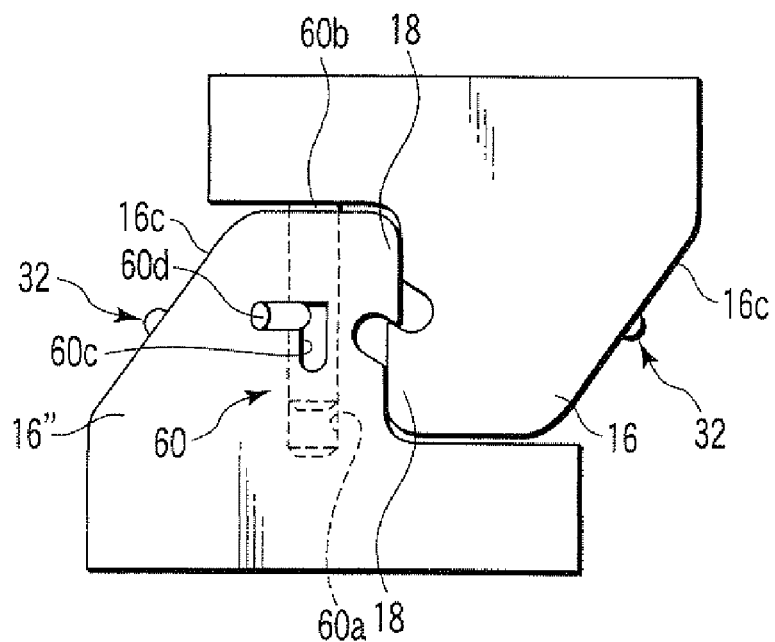
F I G. 15B

COUPLING APPARATUS

CROSS-REFERENCE TO RELATED APPLICATIONS

This is a Continuation Application of PCT Application No. PCT/JP2006/320335, filed Oct. 11, 2006, which was published under PCT Article 21(2) in Japanese.

BACKGROUND OF THE INVENTION

1. Field of the Invention

The present invention relates to a coupling apparatus.

2. Description of the Related Art

Coupling apparatuses are used for detachably connecting objects (hereinafter referred to as "objects to be connected") each other. A coupling apparatus which includes an annular coupling body having a proximal end part attached to a predetermined part of an object to be connected and a distal end part positioned opposite to the proximal end part; and a plurality of fitting projections projecting in an axial direction of the coupling body from a plurality of predetermined circumferential positions on the distal end part of the coupling body, each fitting projection having an engaging hook projecting in one predetermined circumferential direction from its projecting end, is well known by, for example Japanese Patent Application KOKAI Publication No. 9-119577.

In a case that the predetermined parts of two objects are connected each other, the proximal end part of the coupling body of the conventional coupling apparatus as described above is attached to the predetermined part of each of the two objects to be connected. And, the coupling apparatus on the predetermined part of one object to be connected and that on the predetermined part of the other connecting member are approached coaxially to each other until the fitting projections of the distal end part of the coupling body of the one coupling apparatus fit into the fitting recesses defined between the fitting projections of the distal end part of the coupling body of the other coupling apparatus. Next, the coupling body of the one coupling apparatus is rotated in a predetermined circumferential direction relative to that of the other coupling apparatus, thereby engaging the engaging hooks of the fitting projections of the one coupling apparatus with those of the other coupling apparatus. As a result, the two coupling apparatuses are prevented from moving in directions along which the two coupling apparatuses are separated from each other, the two objects to be connected at the predetermined parts of which the two coupling apparatuses are attached are connected each other.

To disconnect the connection of such two conventional coupling apparatuses, the two coupling apparatuses are operated in reverse order to that described above.

Such a conventional coupling apparatus as described above further includes a structure as described below to prevent accidental disconnection of such two conventional coupling apparatuses.

A first disconnection preventing structure is a rotation preventing structure provided for each of the coupling bodies of the two coupling apparatuses to prevent rotation of the coupling bodies of the two coupling apparatuses after the two coupling apparatuses are connected together.

A second disconnection preventing structure is an elastic body which is provided at the end surface of the distal end part of the coupling body of each of the coupling apparatuses and which functions to move the coupling apparatuses away from each other in the axial directions thereof when the coupling apparatuses are coupled with each other to increase friction applied to the engaging hooks of the fitting projections of the coupling apparatuses.

In the conventional coupling apparatus as described above, the coupling body, the fitting projections, and the engaging hooks are formed integrally. And, when the above described conventional coupling apparatus falls on, for example, a hard floor or a road, or when two of the above described conventional coupling apparatus are strongly struck against each other, the fitting projections or engaging hooks of the coupling apparatus may be deformed or damaged. In such a case, the two coupling apparatuses can not be coupled with each other in the above described manner, so that the whole of the damaged coupling apparatus is replaced with a new one.

In addition, the more the diameter of the coupling body increase, the more the process of the fitting projections and engaging hooks formed integrally with the coupling body increase to rise a cost needed for the process.

BRIEF SUMMARY OF THE INVENTION

According to an aspect of the present invention, a is coupling apparatus comprises: an annular coupling body having a proximal end part attached to a predetermined part of an object to be connected and a distal end part positioned opposite the proximal end part; plural fitting projections projecting along an axial direction of the coupling body from plural predetermined circumferential positions on the distal end part of the coupling body, each fitting projection having an engaging hook projecting in one predetermined circumferential direction at a projecting end part thereof, and the plural fitting projections being formed independently of the coupling body; and a fixing structure which is independent of the coupling body and the fitting projections and which detachably fixes the fitting projections to the predetermined circumferential positions on the distal end part of the coupling body, the fixing structure including an insert connection member which is inserted in a through hole formed in at least one of the coupling body and the fitting projection and which is detachably connected to the other.

Two of the coupling apparatuses approach coaxially to each other to fit the fitting projections of one coupling apparatus into fitting recesses between the fitting projections of the other coupling apparatus, next, the coupling body of the one coupling apparatus is rotated in a predetermined circumferential direction relative to the coupling body of the other coupling apparatus to make the engaging hooks of the fitting projections of the one coupling apparatus engage with the engaging hooks of the fitting projections of the other coupling apparatus, thus detachably connecting the two coupling apparatuses each other.

According to another aspect of the present invention, a coupling apparatus comprises: an annular coupling body having a proximal end part attached to a predetermined part of an object to be connected and a distal end part positioned opposite the proximal end part; plural fitting projections projecting along an axial direction of the coupling body from plural predetermined circumferential positions on the distal end part of the coupling body, each fitting projection having an engaging hook projecting in one circumferential direction at a projecting end part thereof, and the plural fitting projections being formed independently of the coupling body; and a fixing structure which is independent of the coupling body and the fitting projections and which detachably fixes the fitting projections to the predetermined circumferential positions on the distal end part of the coupling body.

And, an outward overhang is provided on the outer periphery of the distal end part of the coupling body adjacent to an end surface of the distal end part to project outward in a radial direction of the coupling body. Each fitting projection has an inner periphery placed on a part of the outer periphery of the distal end part of the coupling body, the part being adjacent to the outward overhang in a side opposite to the end surface, and an outward tapering surface inclining toward the inner periphery with the outward tapering surface extending away from the projecting end part in the axial direction. After placing the inner peripheries of the plural fitting projections on the outer periphery of the distal end part of the coupling body to be adjacent to the outward overhang, the fixing structure is detachably fixed on a part of the outer periphery of the distal end part of the coupling body, the part being in a side of the outward overhang opposite to the plural fitting projections along the axial direction. The fixing structure has an inward tapering surface which fits the outward tapering surfaces of the plural fitting projections to fix the plural fitting projections coaxially on the predetermined positions of the outer periphery of the distal end part of the coupling body. Further, the fixing structure has a cutout exposing at least one outward tapering surface of the plural fitting projections, the inner peripheries of which are placed on the outer periphery of the distal end part of the coupling body adjacent to the outward overhang, the cutout allowing at least one fitting projection, the outward tapering surface of which is exposed in the cutout, to be approached to or separated from the position on the outer periphery of the distal end part of the coupling body adjacent to the outward overhang through the cutout.

Two of the coupling apparatuses approach coaxially to each other to fit the fitting projections of one coupling apparatus into fitting recesses between the fitting projections of the other coupling apparatus, next, the coupling body of the one coupling apparatus is rotated in a predetermined circumferential direction relative to the coupling body of the other coupling apparatus to make the engaging hooks of the fitting projections of the one coupling apparatus engage with the engaging hooks of the fitting projections of the other coupling apparatus, thus detachably connecting the two coupling apparatuses each other.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view schematically showing two coupling apparatuses according to a first embodiment of the present invention in their separated state;

FIG. 6 is a side view showing a state in an enlarged manner, in that state an engaging hook of each of fitting projections of one coupling apparatus and an engaging hook of each of fitting projections of the other coupling apparatus are engaged with each other while the two coupling apparatuses of FIG. 4 are coupled with each other;

FIG. 10 is a perspective view schematically showing two coupling apparatuses according to a fourth embodiment of the present invention in their separated state;

FIG. 13A is a schematic plan view showing a state in which a fitting projection according to a first modification and the fitting projection of the coupling apparatus in any one of the first to fourth embodiments are close to each other in an axial direction;

FIG. 13B is a schematic plan view showing a state in which the fitting projection according to the first modification and the fitting projection of the coupling apparatus in any one of the first to fourth embodiments are prevented from being rotated in one circumferential direction to be connected with each other after these fitting projections are close to each other in FIG. 13A;

FIG. 15A is a schematic plan view showing a state in which a fitting projection according to a second modification and the fitting projection of the coupling apparatus in any one of the first to fourth embodiments are rotated in one circumferential direction to be connected with each other after these fitting projections are close to each other, but before a friction increasing mechanism of the fitting projection according to the second modification operates to increase friction force generated between engaging hooks of these fitting projections;

FIG. 15B is a schematic plan view showing a state in which the fitting projection according to the second modification and the fitting projection of the coupling apparatus in any one of the first to fourth embodiments are rotated in one circumferential direction to be connected with each other after these fitting projections are close to each other, and then the friction force generated between the engaging hooks of these fitting projections is increased by the operation of the friction increasing mechanism of the fitting projection according to the second modification;

DETAILED DESCRIPTION OF THE INVENTION

First Embodiment

A coupling apparatus 10 according to a first embodiment of the present invention will be described with reference to FIGS. 1 to 3.

Figure 2:
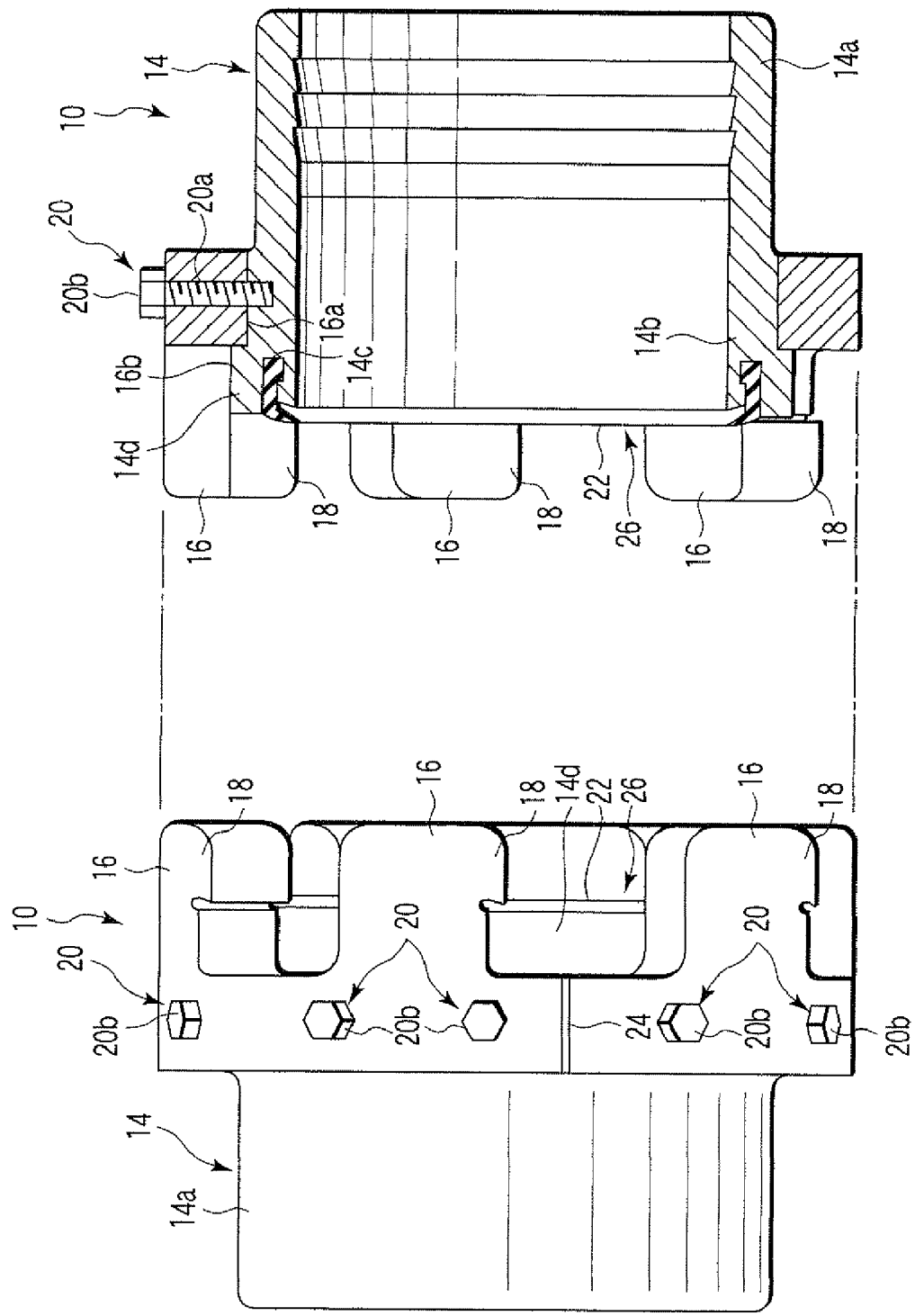
FIG. 2 is a side view schematically showing the two coupling apparatuses of FIG. 1 with one of the coupling apparatuses being in a cross section.
Figure 3:
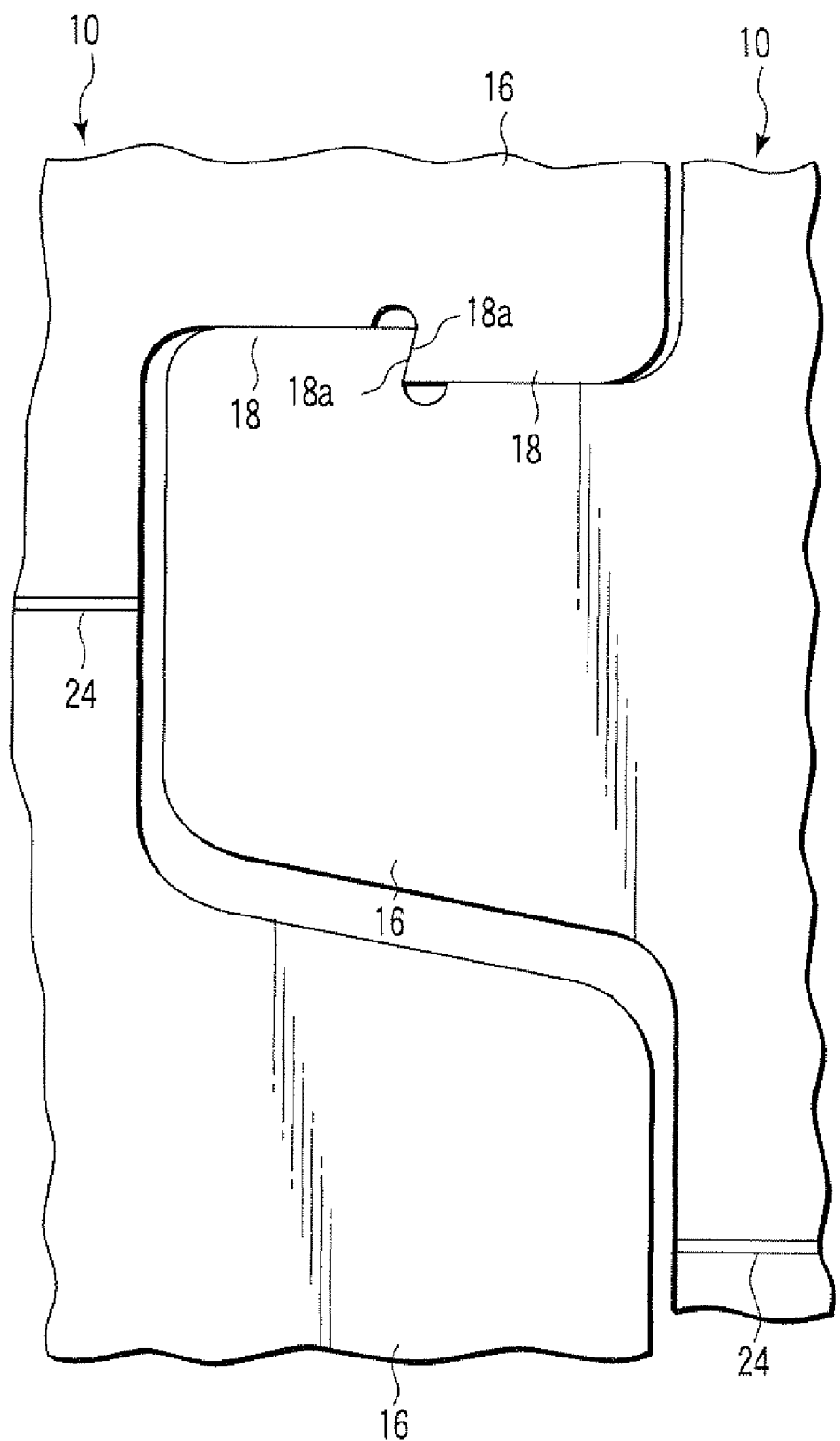
FIG. 3 is a side view showing a state in an enlarged manner, in that state an engaging hook of each of fitting projections of one coupling apparatus and an engaging hook of each of fitting projections of the other coupling apparatus are engaged with each other while the two coupling apparatuses of FIG. 1 are coupled with each other.

FIGS. 1 and 2 show an entire configuration of the coupling apparatus 10 according to the first embodiment of the present invention. FIG. 1 is a perspective view schematically showing two of the coupling apparatus 10 according to the first embodiment of the present invention in a state in which the two coupling apparatuses 10 are separated from each other. And, FIG. 2 is a side view schematically showing the two coupling apparatuses 10 of FIG. 1 with one of the coupling apparatuses being in a cross section.

The coupling apparatus 10 is used for detachably connecting objects (hereinafter referred to as "objects to be connected") 12 each other. In this embodiment, the object 12 to be connected is a known flexible hose in which fluid such as water is flown.

The coupling apparatus 10 includes an annular coupling body 14 which has a proximal end part 14a attached to a predetermined part (one end part, in this embodiment) of the object 12 to be connected and a distal end part 14b located opposite to the proximal end part 14a. The coupling apparatus 10 further includes a plurality of fitting projections 16 projecting from a plurality of predetermined circumferential positions on the distal end part 14b of the coupling body 14 along an axial direction of the coupling body 14, and each fitting projection 16 has an engaging hook 18 projecting from its projecting end part in one predetermined circumferential direction.

The coupling body 14 and the plural fitting projections 16 are formed by a coupling-body formation process and a fitting-projection formation process that are independent of each other. The fitting projections 16 are detachably fixed to predetermined circumferential positions on the distal end part 14b of the coupling body 14 by fixing structures 20 which are formed by a fixing-structure formation process and which are independent of the coupling body 14 and fitting projections 16.

The coupling body 14 has outer dimensions much larger than those of each fitting projection 16 the shape of which is complex. However, the shape of the coupling body 14 is simpler than that of the fitting projection 16. Since the simpler shaped coupling body 14 is formed by the coupling-body formation process independent of the fitting-projection formation process for forming the complex shaped fitting projection 16, a formation cost for the coupling body 14 is low.

In this embodiment, the coupling body 14 has a cylindrical shape, and an elastic member 22 is provided on an end surface of the distal end part 14b. The elastic member 22 is an annular rubber sealing member embedded in an embedding groove 14c formed annularly in the end surface of the distal end part 14b, and projects from the end surface by a predetermined amount.

An outward overhang 14d is provided on a position of the outer periphery of the distal end part 14b of the coupling body 14, the position being adjacent to the end surface of the distal end part 14b, to project outward in the radial direction of the coupling body 14 by a predetermined amount. In this embodiment, the outward overhang 14d is formed integrally with the coupling body 14. However, the outward overhang 14d may be formed separately from the coupling body 14 and then may be fixed to the predetermined position on the outer periphery of the coupling body 14 by a known fixing structure including for example welding, a fixing screw, or adhesive Further, the outward overhang 14d may extend all the way on the outer periphery of the distal end part 14b of the coupling body 14 in its circumferential direction. Alternatively, the outward overhang 14d may be disposed on each of plural circumferentially separated positions on the outer periphery of the distal end part 14b of the coupling body 14 to correspond to each of the plural fitting projections 16.

The plural fitting projections 16 are formed in a plurality of blocks each having a predetermined number of fitting projections 16. In this embodiment, each block includes two fitting projections 16. However, each block may be formed to include one, three, or more fitting projections 16.

Since the fitting projection 16 which is far smaller in outer dimensions than each coupling body 14 but has a shape more complex than that of the coupling body 14, is formed by the fitting-projection formation process independent of the coupling-body formation process for the coupling body 14, the fitting projection 16 can be formed by an inexpensive formation process such as a lost-wax process, a forging process, and the like.

Each of the plural fitting projections 16 has an inner periphery 16a which is placed on a part of the outer periphery of the distal end part 14b of the coupling body 14, the part being adjacent to the outward overhang 14d in a side thereof opposite to the end surface of the distal end part 14b. In this embodiment, each fitting projection 16 further has a stepped inner periphery 16c which is in contact with an outer periphery of the outward overhang 14b and a stepped surface between this outer periphery and the above described fitting projection placing part of the outer periphery of the distal end part 14b of the coupling body 14 when the inner periphery 16a is placed on the fitting projection placing part of the outer periphery of the distal end part 14b of the coupling body 14.

The fixing structure 20 includes an insert connection member 20b which is inserted in a through hole 20a formed in at least one of the coupling body 14 and the block including the predetermined number of fitting projections 16 and which is detachably connected to the other. As shown clearly in FIG. 2, the through holes 20a are formed in the block including the predetermined number of fitting projections 16, and the insert connection member 20b is a bolt with a head. According to an aspect of this invention, the insert connection member 20b may be a stud bolt or a stud pin planted in the fitting-projection placing part of the outer periphery of the distal end part 14b of the coupling body 14. And, a nut is screwed on the projecting end part of the stud bolt and a securing pin is combined with the projecting end part of the stud pin.

A spot facing may be formed around the through hole 20a in the outer surface of the block to receive the head of the headed bolt, the nut screwed on the projecting end part of the stud bolt, or the securing pin combined with the projecting end part of the stud pin serving as the insert connection member 20b, and to prevent these from projecting out from the outer surface. Such a spot facing prevent the head of the headed bolt, the nut screwed on the projecting end part of the stud bolt, or the securing pin combined with the projecting end part of the stud pin serving as the insert connection member 20b, from striking an outer object and being damaged by the strike. Further, the spot facing prevent the block, that is the fitting projections 16, from being displaced or separated from the predetermined position on the outer periphery of the distal end part 14b of the coupling body 14.

When the plural fitting projections 16 formed as the plural blocks as described above are placed on the predetermined positions of the outer periphery of the distal end part 14b of the coupling body 14, pressure deformable members 24 are interposed between the blocks of the fitting projections 16 in the circumferential direction of the coupling body 14. The pressure deformable member 24 may be an elastic member including for example rubber, or a metal of relatively low hardness.

The pressure deformable members 24 prevent the plural fitting projections 16 fixed on the plural predetermined positions of the outer periphery of the distal end part 14b of the coupling body 14 by the fixing structures 20 as described above, from being displaced in the circumferential direction.

The two coupling apparatuses 10, 10 configured as described above with reference to FIGS. 1 and 2 will be detachably connected in the following manner.

The two coupling apparatuses 10 approach coaxially to each other until the fitting projections 16 of one of the two coupling apparatus 10 fit in fitting recesses between the fitting projections 16 of the other coupling apparatus 10. Next, the coupling body 14 of the one coupling apparatus 10 is rotated in a predetermined circumferential direction relative to the coupling body 14 of the other coupling apparatus 10. As a result, the engaging hooks 18 of the fitting projections 16 of the one coupling apparatus 10 engage with the engaging hooks 18 of the fitting projections 16 of the other coupling apparatus 10, as shown in FIG. 3, and thus the two coupling apparatuses 10, 10 are detachably connected to each other.

At this time, the elastic members 22 on the end surfaces of the distal end parts 14b of the coupling bodies 14 of the coupling apparatuses 10, 10 are pressed against each other such to urge the coupling bodies 14 of these coupling apparatuses 10, 10 to make the coupling bodies 14 move away from each other in their axial direction. As a result, friction force generated between engaging surfaces 18a of the engaging hooks 18 of the fitting projections 16 of the one coupling apparatus 10 and those of the other coupling apparatus 10 is increased.

This means that the elastic members 22 configure a friction increasing mechanism 26 which presses the coupling bodies 14 of the two coupling apparatuses 10 to move the coupling bodies 14 away from each other in the axial direction when the two coupling apparatuses 10, 10 are coupled each other, thus increasing the friction force loaded on the engaging hooks 18 of the fitting projections 16 of the coupling apparatuses 10, 10.

In this embodiment, the locking surface 18a inclines from its proximal end at which the engaging hook 18 projects from the fitting projection 16 corresponding thereto toward its distal end such that its distal end approaches the proximal end of the fitting projection 16 corresponding thereto. This inclination makes the above described engagement of the locking surface 18a of the engaging hook 18 of each fitting projection 16 of the one coupling apparatus 10 with that of the other coupling apparatus 10 strengthen.

In this embodiment, the objects 12 to be connected to which the coupling apparatuses 10 are attached are known flexible hoses for flowing fluid such as water, as described above. When the fluid flows in the objects 12, 12 after the two coupling apparatuses 10, are coupled each other as described above, the elastic bodies 22 on the end surfaces of the distal end parts 14b of the coupling bodies 14 of the two coupling apparatuses 10 expand outward in the radial direction of each coupling body 14 by the pressure of the fluid. The expanded elastic bodies 22 urges the coupling bodies 14 of the two coupling apparatuses 10 to make the coupling bodies 14 move further away from each other in their axial direction. As a result, the friction force generated between the locking surface 18a of the engaging hook 18 of each fitting projection 16 of the one coupling apparatus 10 and that of the other coupling apparatus 10 is further increased so that the coupling of the two coupling apparatuses 10 each other is also further strengthened.

In order to separate the two coupling apparatuses 10, 10 coupled each other as described above from each other, it may be that the flow of fluid in the objects 12 is stopped and then the two coupling apparatuses 10 are operated in a manner which is reverse to the above described operation for coupling the two coupling apparatuses 10, 10.

In the above described embodiment, the objects 12 to which the coupling apparatuses 10 are attached are known flexible hoses for flowing fluids such as water. However, the objects 12 to be connected may be hard pipes or solid bodies. When a structure is formed by using hard pipes, solid bodies, or a combination thereof, the coupling apparatuses 10 facilitate the assembly and disassembly of such a structure.

Further, in the coupling apparatus 10 of the configuration according to the above described embodiment, the block having a predetermined number of fitting projections 16 may be fixed to each of plural coupling bodies 14 of different diameters by the fixing structure 20.

This makes manufacturing costs for coupling apparatuses 10, . . . that have coupling bodies 14 of different diameters being lower. That is, since the coupling bodies 14 are simple in structure, they can be formed easily even if their diameters are different from each other. The block with a predetermined number of fitting projections 16 is complex in structure and the formation thereof is complicated. However, it is not necessary to form blocks having inner peripheries 16a of different dimensions to match the coupling bodies 14 of different diameters.

For manufacturing a plurality of coupling apparatuses 10 having coupling bodies 14 of different diameters, there is only need to prepare the coupling bodies 14 of different diameters, which are easy to form, and to prepare the predetermined number of blocks, each having the same dimensions as to each other and having the predetermined number of fitting projections 16 each of which is complex in its structure and is troublesome in its formation. When the blocks of the same dimensions are fixed to the predetermined circumferential positions on the outer periphery of the distal end part 14b of each of the coupling bodies 14 of different diameters by the fixing structures 20, each of the gaps generated between the plural blocks in the circumferential direction vary in accordance with the diameter of the outer periphery of the distal end part 14b of the coupling body 14. However, the variation of the gap is adjusted by the change in the dimension of the pressure deformable member 24 interposed in the gap in the circumferential direction. The dimension of the pressure deformable member 24 can be changed easily at a low cost.

That is, the coupling apparatus 10 of the configuration according to the above described embodiment can reduce the manufacturing costs of various coupling apparatuses 10 having the coupling bodies 14 of various diameters, compared to the conventional one. Further, even when a part of fitting projections 16 or engaging hooks 18 of each coupling apparatus 10 is damaged, it is enough to replace only the block having the damaged part with a new block, so that there is no need to replace the entire damaged coupling apparatus 10 with a new coupling apparatus 10.

Second Embodiment

Next, a coupling apparatus 30 according to a second embodiment of the present invention will be described with reference to attached FIGS. 4 to 6.

Figure 4:
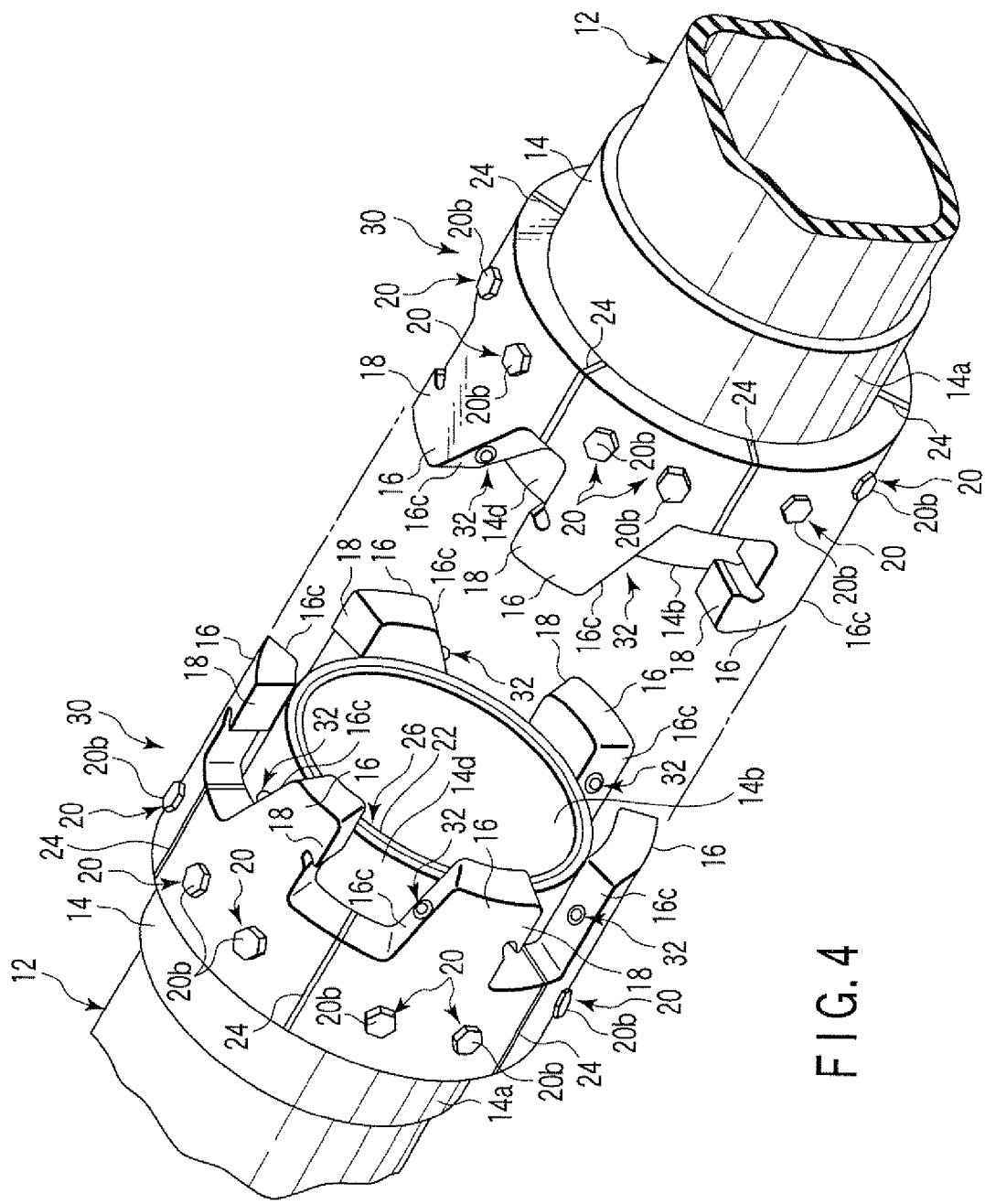
FIG. 4 is a perspective view schematically showing two coupling apparatuses according to a second embodiment of the present invention in their separated state.
Figure 5:
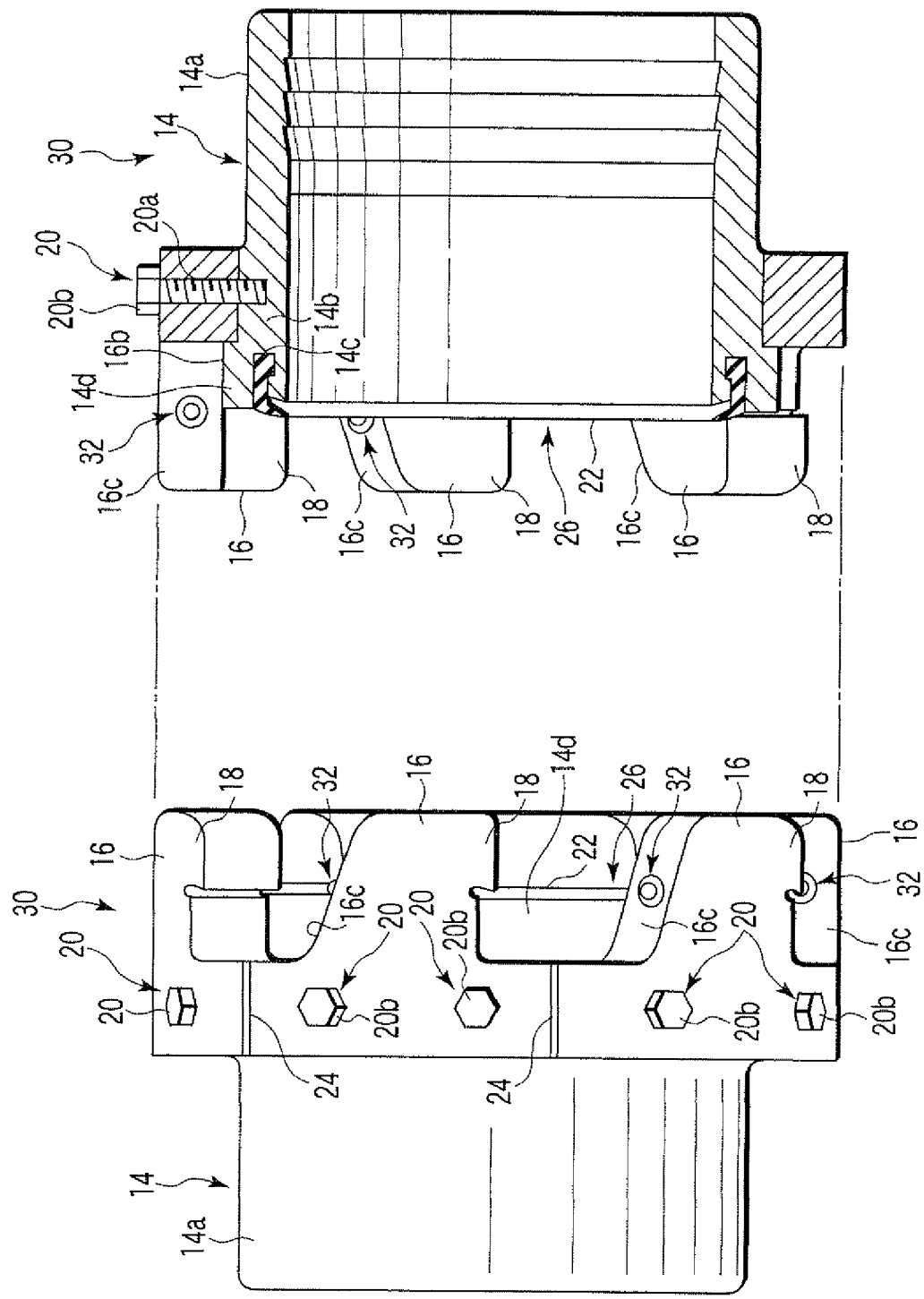
FIG. 5 is a side view schematically showing the two coupling apparatuses of FIG. 4 with one of the coupling apparatuses being in a cross section.

FIGS. 4 and 5 show the entire configuration of the coupling apparatus 30 according to the second embodiment of the present invention. FIG. 4 is a perspective view schematically showing two of the coupling apparatus 30 according to the second embodiment of the present invention in a state in which she two coupling apparatuses 30 are separated from each other, and FIG. 5 is a side view of the two coupling apparatuses 30 of FIG. 4 with one of the two coupling apparatuses 30 being cross sectioned.

Most part of the component members of the coupling apparatus 30 according to the second embodiment is the same as that of the coupling apparatus 10 according to the first embodiment described above with reference to FIGS. 1 to 3. Accordingly, in the coupling apparatus 30 according to the second embodiment of the present invention and described below with reference to FIGS. 4 to 6, the component members corresponding to those in the coupling apparatus 10 according to the first embodiment of the present invention and described above with reference to FIGS. 1 to 3 are indicated by the same reference numbers as those indicating the corresponding ones in the coupling apparatus 10 according to the first embodiment of the present invention and described above with reference to FIGS. 1 to 3, and detailed explanations thereof are omitted.

The difference in structure of the coupling apparatus 30 according to the second embodiment from the coupling apparatus 10 according to the first embodiment is as follows.

i. the planar shape of each of the plural fitting projections 16;

ii. an urging mechanism 32 is provided on a side surface 16c of the fitting projection 16 opposite to a side surface thereof from which the engaging hook 18 projects;

iii. a block has only one fitting projection 16 as the predetermined number of the fitting projection.

As described in the first embodiment, each block may have more than one fitting projection 16.

When the two coupling apparatuses 30, 30 are coupled with each other, the urging mechanisms 32 move the side surfaces 16c of the fitting projections 16 of one coupling apparatus 30 away from the side surfaces 16c of the fitting projections 16 of the other coupling apparatus 30, the former side surface facing the latter side surface. As a result, the fitting projections 16 of the one coupling apparatus 30 are urged relative to the fitting projections 16 of the other coupling apparatus 30 in such a predetermined circumferential direction that the engagement of the engaging hooks 18 of the fitting projections 16 of the one coupling apparatus 30 with those of the other coupling apparatus 30 is more strengthened.

Specifically, in each of the fitting projections 16 of the coupling apparatus 10 according to the first embodiment of the present invention described above with reference to FIGS. 1 to 3, the two side surfaces located in the circumferential direction of the coupling body 14 and extending in the direction along the axial direction of this coupling body 14 extend in parallel to and in the same direction relative to the axial direction. In contrast thereto, in each of the fitting projections 16 of the coupling apparatus 30 according to the second embodiment, the two side surfaces are also located in the circumferential direction of the coupling body 14 and extend in the direction along the axial direction of this coupling body 14, but one of the two side surfaces from which the engaging hook 18 projects at its projecting end part extends in the direction along the axial direction of this coupling body 14 and the other side surface 16c located opposite to the one side surface inclines to being away from the one side surface while it extends from the projecting end surface of the fitting projection 16 corresponding thereto toward the base end thereof.

And, as shown in detail in FIG. 6, the urging mechanism 32 provided on the other side surface 16c that inclines as described above includes a cup-shaped receptacle 32a embedded in a predetermined position of the other side surface 16c. The urging mechanism 32 further includes a ball-shaped pressing member 32b disposed at a position close to the other side surface 16c in the cup-shaped receptacle 32a, and an urging member 32c disposed at a position away from the other side surface 16c in the cup-shaped receptacle 32a. The urging member 32c urges the ball-shaped pressing member 32b in a direction in which the ball-shaped pressing member 32b projects from the other side surface 16c.

The portion close to the other side surface 16c in the cup-shaped receptacle 32a is worked to have a diameter smaller than that of the ball-shaped pressing member 32b. As a result, the ball-shaped pressing member 32b urged by the pressing member 32c in the cup-shaped receptacle 32a as described above, is prevented from falling out from the receptacle 32a.

In this embodiment, the pressing member 32c is a compression coil spring, but it may be an elastic member such as a rubber member.

When the two coupling apparatuses 30 are detachably coupled with each other, the urging mechanism 32 acts in a manner as described below. When the two coupling apparatuses 30, 30 coaxially approach each other until the fitting projections 16 of the one coupling apparatus 30 fit into the fitting recesses between the fitting projections 16 of the other coupling apparatus 30, the ball-shaped pressing member 32b of the urging mechanism 32 of the other side surface 16c of each fitting projection 16 of the one coupling apparatus 30 and the ball-shaped pressing member 32b of the urging mechanism 32 of the other side surface 16c of each fitting projection 16 of the other coupling apparatus 30 come into contact with each other so that each ball-shaped pressing member 32b moves inward in the respective cup-shaped receptacle 32a against the urging force of the urging member 32c corresponding thereto.

When the fitting of the fitting projections 16 of the one coupling apparatus 30 into the fitting recesses between the fitting projections 16 of the other coupling apparatus 30 becomes more deeper and the engaging surface 18a of the engaging hook 18 of each fitting projection 16 of the one coupling apparatus 30 approaches the base end of each fitting projection 16 of the other coupling apparatus 30 beyond the engaging surface 18a of the engaging hook 18 of each fitting projection 16 of the other coupling apparatus 30, the urging force of the urging member 32c of the urging mechanism 32 on the other side surface 16d of each fitting projection 16 of the one coupling apparatus 30 and the urging force of the urging member 32c of the urging mechanism 32 on the other side surface 16d of each fitting projection 16 of the other coupling apparatus 30 operate to move each fitting projection 16 of the one coupling apparatus 30, together with the coupling boy 14 thereof, in a predetermined circumferential direction and to move each fitting projection 16 of the other coupling apparatus 30, together with the coupling boy 14 thereof, in a predetermined circumferential direction, through the ball-shaped pressing members 32b being kept in contact with each other as described above, so that the engaging hooks 18 of the fitting projections 16 of the one coupling apparatus 30 and those of the other coupling apparatus 30 approach each other more closely. As a result, the engaging hooks 18 of the fitting projections 16 of the one coupling apparatus 30 engage with the engaging hooks 18 of the fitting projections 16 of the other coupling apparatus 30 are engaged with each other as shown in FIG. 6, thus, the two coupling apparatuses 30, 30 are detachably connected together.

At this time, the elastic members 22 on the end surfaces of the distal end parts 14h of the coupling bodies 14 of the two coupling apparatuses 30, 30 are pressed against each other to urge the coupling bodies 14 of the two coupling apparatuses 30, 30 away from each other in their axial direction, and thus the friction force generated between the locking surface 18a of the engaging hook 18 of each fitting projection 16 of the one coupling apparatus 30 and the locking surface 18a of the engaging hook 18 of each fitting projection 16 of the other coupling apparatus 30 is increased.

In addition to this, like the above described urging by the elastic bodies 22, the urging force of the urging member 32c of the urging mechanism 32 of the other side surface 16d of each fitting projection 16 of the one coupling apparatus 30 and the urging force of the urging member 32c of the urging mechanism 32 of the other side surface 16d of each fitting projection 16 of the other coupling apparatus 30 further increase the friction force generated between the engaging surface 18a of the engaging hook 18 of each fitting projection 16 of the one coupling apparatus 30 and the engaging surface 18a of the engaging hook 18 of each fitting projection 16 of the other coupling apparatus 30, through the ball-shaped pressing members 32 being kept in contact with each other as described above.

Furthermore, it goes without saying that the coupling apparatus 30 according to the second embodiment described above with reference to FIGS. 4 to 6 can enjoy the various actions and technical advantages obtained by the coupling apparatus 10 according to the first embodiment described above with reference to FIGS. 1 to 3.

Third Embodiment

Next, a coupling apparatus 40 according to a third embodiment of this invention will be explained with reference to attached FIG. 7 to FIG. 9.

Figure 7:
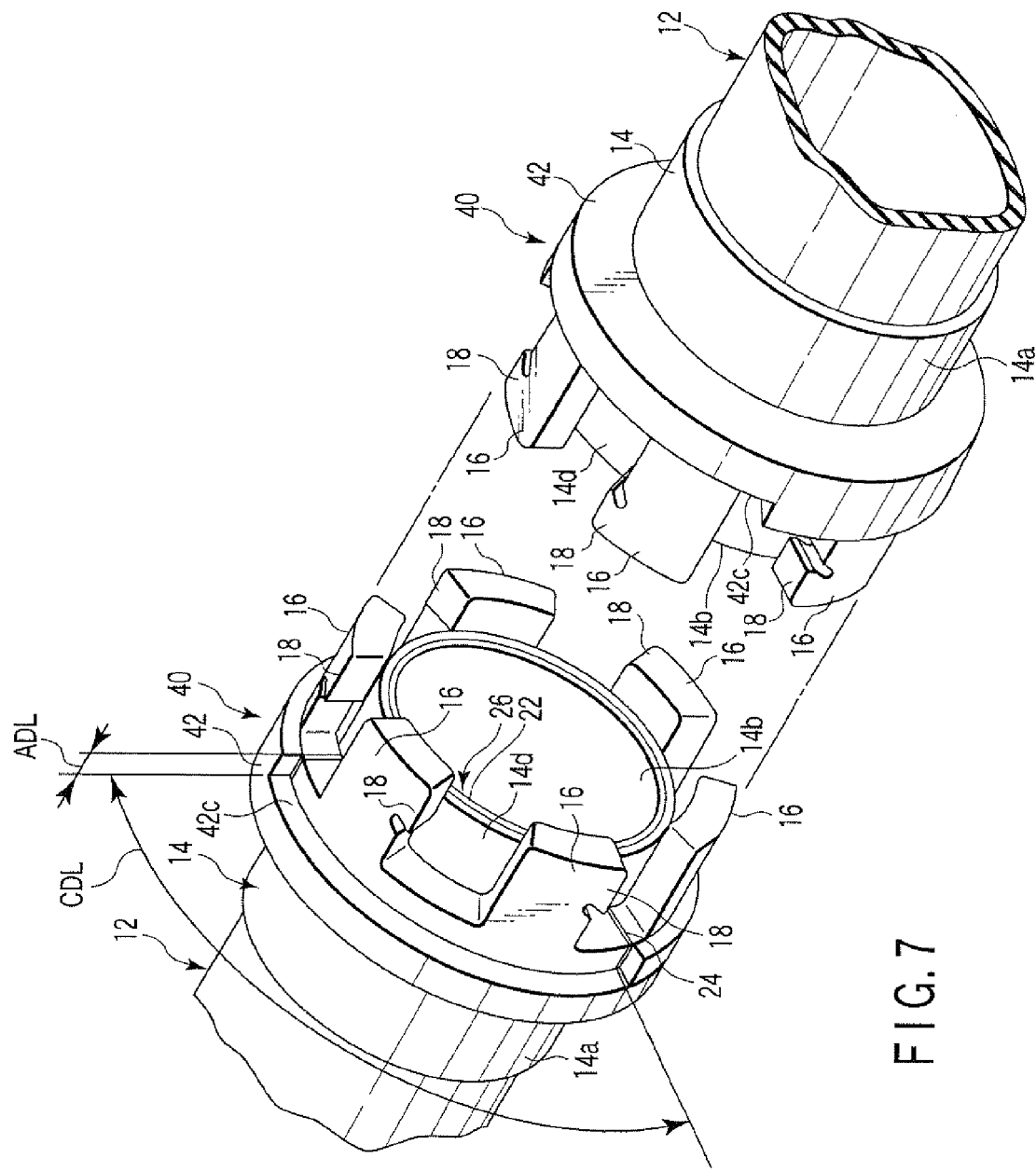
FIG. 7 is a perspective view schematically showing two coupling apparatuses according to a third embodiment of the present invention in their separated state.
Figure 8:
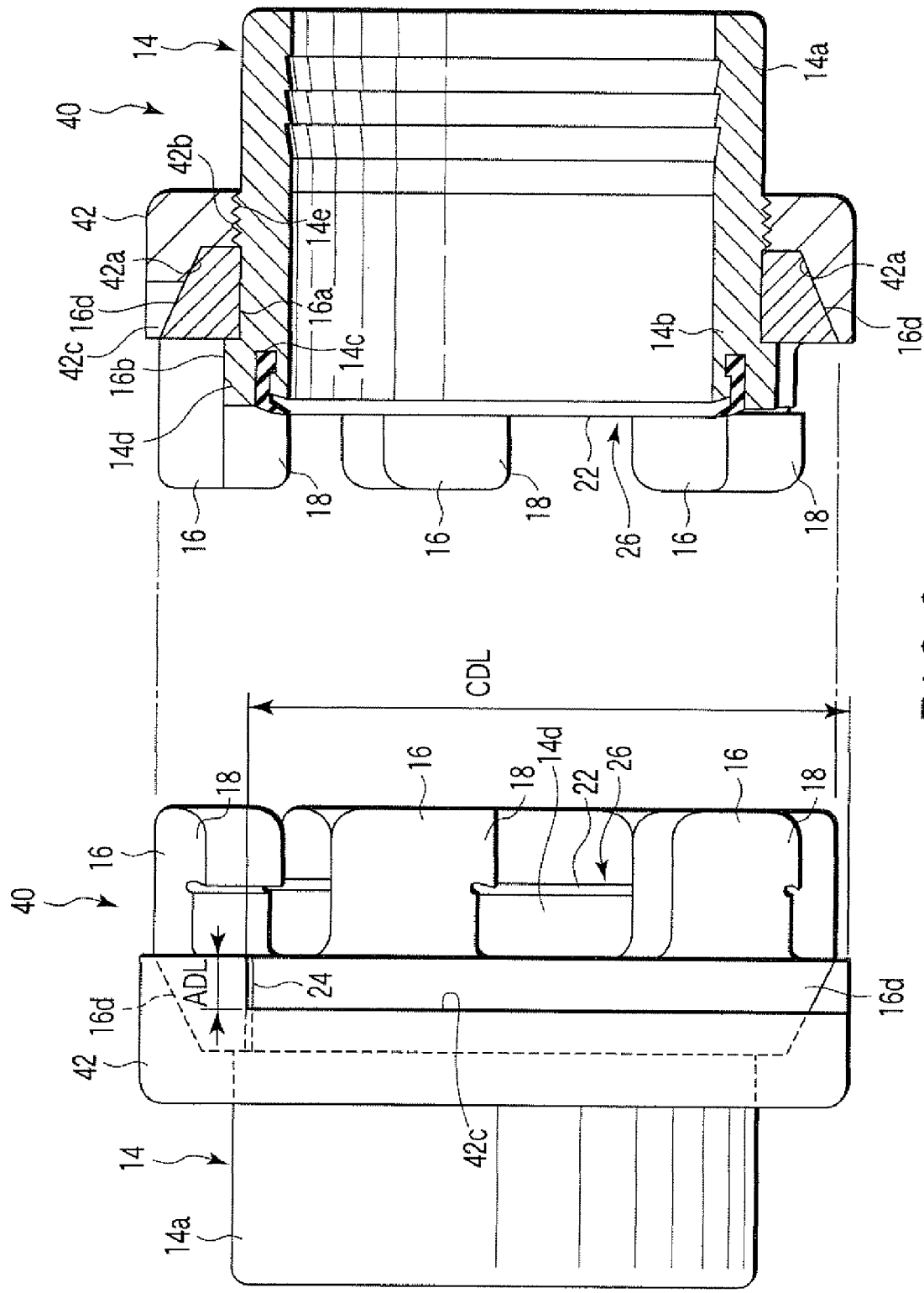
FIG. 8 is a side view schematically showing the two coupling apparatuses of FIG. 7 with one of the coupling apparatuses being in a cross section.

In FIG. 7 and FIG. 8, the entire configuration of the coupling apparatus 40 according to the third embodiment of this invention is shown. FIG. 7 is a perspective view schematically showing two of the coupling apparatus 40 according to the third embodiment of this invention in a state that the two coupling apparatuses 40 are separated from each other, and FIG. 8 is a side view schematically showing the two coupling apparatuses 40 of FIG. 7 with one of the two coupling apparatuses 40 being in a cross section.

Most part of the component members of the coupling apparatus 40 according to the third embodiment is the same as that of the coupling apparatus 10 according to the first embodiment described above with reference to FIGS. 1 to 3. Accordingly, in the coupling apparatus 40 according to the third embodiment of the present invention and described below with reference to FIGS. 7 to 9, the component members corresponding to those in the coupling apparatus 10 according to the first embodiment of the present invention and described above with reference to FIGS. 1 to 3 are indicated by the same reference numbers as those indicating the corresponding ones in the coupling apparatus 10 according to the first embodiment of the present invention and described above with reference to FIGS. 1 to 3, and detailed explanations thereof are omitted.

The coupling apparatus 40 according to the third embodiment differs from the coupling apparatus 10 according to the first embodiment in a configuration of each block having a predetermined number of fitting projections 16 and in a configuration of a fixing structure 42 for detachably fixing a plurality of blocks to a plurality of predetermined circumferential positions on the outer periphery of the distal end part 14b of the coupling body 14.

Specifically, the outer periphery of the proximal end part of the block with the predetermined number of fitting projections 16, the proximal end part being opposite to the projecting end part of the block, is shaped as an outward tapering surface 16d which inclines from the projecting end part toward the inner periphery 16a.

The fixing structure 42 is an annular member. After the inner peripheries 16a of the blocks are placed on the circumferentially separated plural positions adjacent to the outward overhang 14d on the outer periphery of the distal end part 14b of the coupling body 14, the annular member is detachably fixed to a part opposite to the outward overhang 14d relative to the plural blocks on the outer periphery of the distal end part 14b of the coupling body 14.

The fixing structure 42 has an inward tapering surface 42a that fits on the outward tapering surfaces 16b of the blocks when the fixing structure 42 is fixed on the outer periphery of the distal end part 14b of the coupling body 14 as described above. As a result, the fitted fixing structure 42 detachably and coaxially fixes the blocks, that is, the fitting projections 16, on the above described predetermined positions of the outer periphery of the distal end part 14b of the coupling body 14. At the same time, the fixing structure 42 holds the plural blocks, that is the plural fitting projections 16, on the outward overhang 14d of the outer periphery of the distal end part 14b of the coupling body 14 in the axial direction. With this holding, the plural blocks, that is the plural fitting projections 16, are fixed on the above described predetermined positions of the outer periphery of the distal end part 14b of the coupling body 14 so as to be immovable in the axial direction.

The fixing structure 42 can be detachably fixed to the outer periphery of the end part of the coupling body 14 by means of a known fixing element including for example a fixing screw or adhesive. In this embodiment, a male thread 14e is formed on the part of the outer periphery of the distal end part 14b of the coupling body 14, the part being opposite to the outward overhang 14d relative to the plural blocks, that is the plural fitting projections 16, and a female thread 42b formed on the inner periphery of the fixing structure 42 adjacent to the axially inside end of the inward tapering surface 42a is screwed on the male thread 14e.

A cutout 42c is further formed in the fixing structure 42 to be cutout from an outer end of a side of the plural blocks, that is a side of the plural fitting projections 16, toward an inner end of a side opposite to the plural blocks, that is a side opposite to the plural fitting projections 16. The cutout 42c has a narrow square shape extending in the circumferential direction of the outer periphery of the distal end part 14b of the coupling body 14. In the cutout 42c of the narrow square shape, the length CDL (length in the circumferential direction) in the circumferential direction of the outer periphery of the distal end part 14b of the coupling body 14 is slightly longer than the length of each block (the length in the circumferential direction) in the circumferential direction. Further, in the cutout 42c of the narrow square shape, the length ADL (length in the axial direction) in the axial direction of the coupling body 14 is shorter than the length (length in the axial direction) of the inward tapering surface 42a of the block in the axial direction, and is preferably slightly larger than a substantially half of the length (length in the axial direction) of the inward tapering surface 42a of the block.

The two coupling apparatuses 40, each configuring as described above and according to the third embodiment, may be coupled with or separated from each other in the same manner as that about the two coupling apparatuses 10 of the first embodiment described above with reference to FIGS. 1 to 3.

Figure 9:
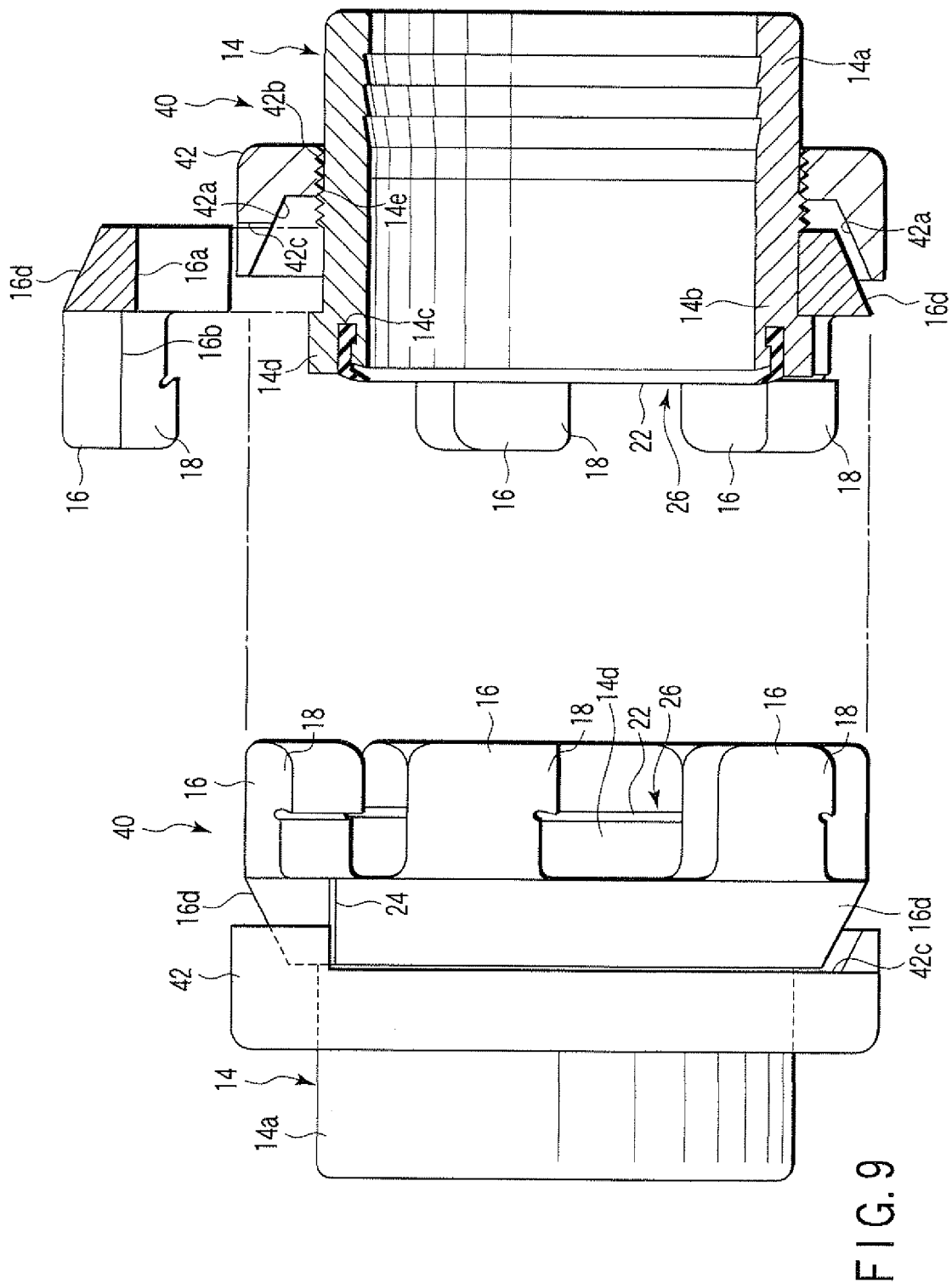
FIG. 9 is a side view schematically showing a state in which a part of plural fitting projections is separated from a predetermined position on an outer periphery of a distal end part of each of coupling bodies of the two coupling apparatuses of FIG. 8.

In the case where the block having the damaged fitting projection 16 or damaged engaging hook 18 is replaced with a new block, at first the fixation of the fixing structure 42 to the outer periphery of the distal end part 14b of the coupling body 14 is released, and then the fixing structure 42 is moved on the outer periphery of the distal end part 14b of the coupling body 14 in the axial direction of the coupling body 14 until the inner end of the cutout 42c is moved away from the end surface of the distal end part 14b of the coupling body 14 beyond the base end surfaces of the plural blocks, that is the plural fitting projections 16, placed on the plural circumferential positions of the outer periphery of the distal end part 14b of the coupling body 14, as shown in FIG. 9. Further, the position of the fixing structure 42 relative to the outer periphery of the distal end part 14b of the coupling body 14 in the circumferential direction is adjusted to locate the both circumferential ends of the block to be replaced within a range between the both circumferential ends of the cutout 42c.

As a result, the outward tapering surface 16d of the block to be replaced is exposed completely within the range of the cutout 42c of the fixing structure 42, so that the block to be replaced can be separated from the circumferential position on the outer periphery of the distal end part 14b of the coupling body 14 through the cutout 42c, as shown in FIG. 9, and then the new block can be placed on the cleared circumferential position on the outer periphery of the distal end part 14b of the coupling body 14 through the cutout 42c.

During this time, other blocks on the outer periphery of the distal end part 14b of the coupling body 14 are prevented from separating therefrom since the base end side parts of their outward tapering surfaces 16d are covered with the projecting end side part of the inward tapering surface 42a of the fixing structure 42 excluding the portion corresponding to the cutout 42c.

A pressure-deformable member 24 is interposed between each of the circumferential ends of the new block and the new block side circumferential end of each of the two blocks located adjacent to the new block on the outer periphery of the distal end part 14b of the coupling body 14.

Thereafter, the fixing structure 42 is moved on the outer periphery of the distal end part 14b of the coupling body 14 in a direction approaching the end surface of the distal end part 14b of the coupling body 14, that is in a direction approaching the projecting end parts of the plural fitting projections 16 of the plural blocks, until the inward tapering surface 42a of the fixing structure 42 fits on the outward tapering surfaces 16d of the plural blocks placed on the plural circumferential positions of the outer periphery of the distal end part 14b of the coupling body 14. As a result, the plural blocks, that is the plural fitting projections 16, are held between the fixing structure 42 and the outward overhang 14d of the outer periphery of the distal end part 14b of the coupling body 14 in the axial direction, so that the plural blocks, that is the plural fitting projections 16, can be detachably fixed on the plural circumferential positions of the outer periphery of the distal end part 14b of the coupling body 14 by the fixing structure 42.

That is, in the coupling apparatus 40 of this embodiment, the operation for replacing the block having the damaged fitting projection 16 or damaged engaging hook 18 with a new block is easy.

Fourth Embodiment

Figure 11:
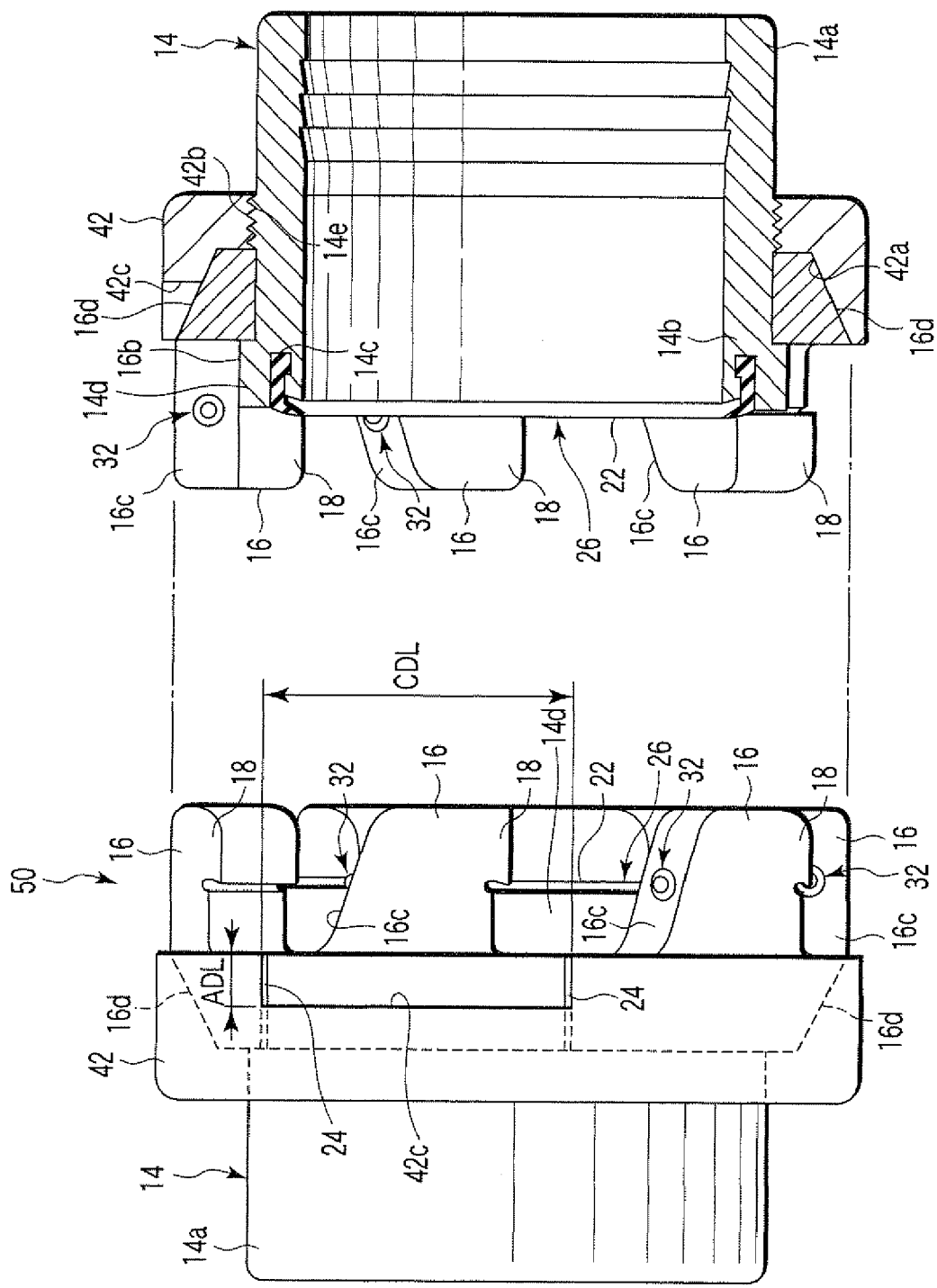
FIG. 11 is a side view schematically showing the two coupling apparatuses of FIG. 10 with one of the coupling apparatuses being in a cross section.

Next, a coupling apparatus 50 according to a fourth embodiment of this invention will be explained with reference to attached FIG. 10 to FIG. 12.

Figure 12:
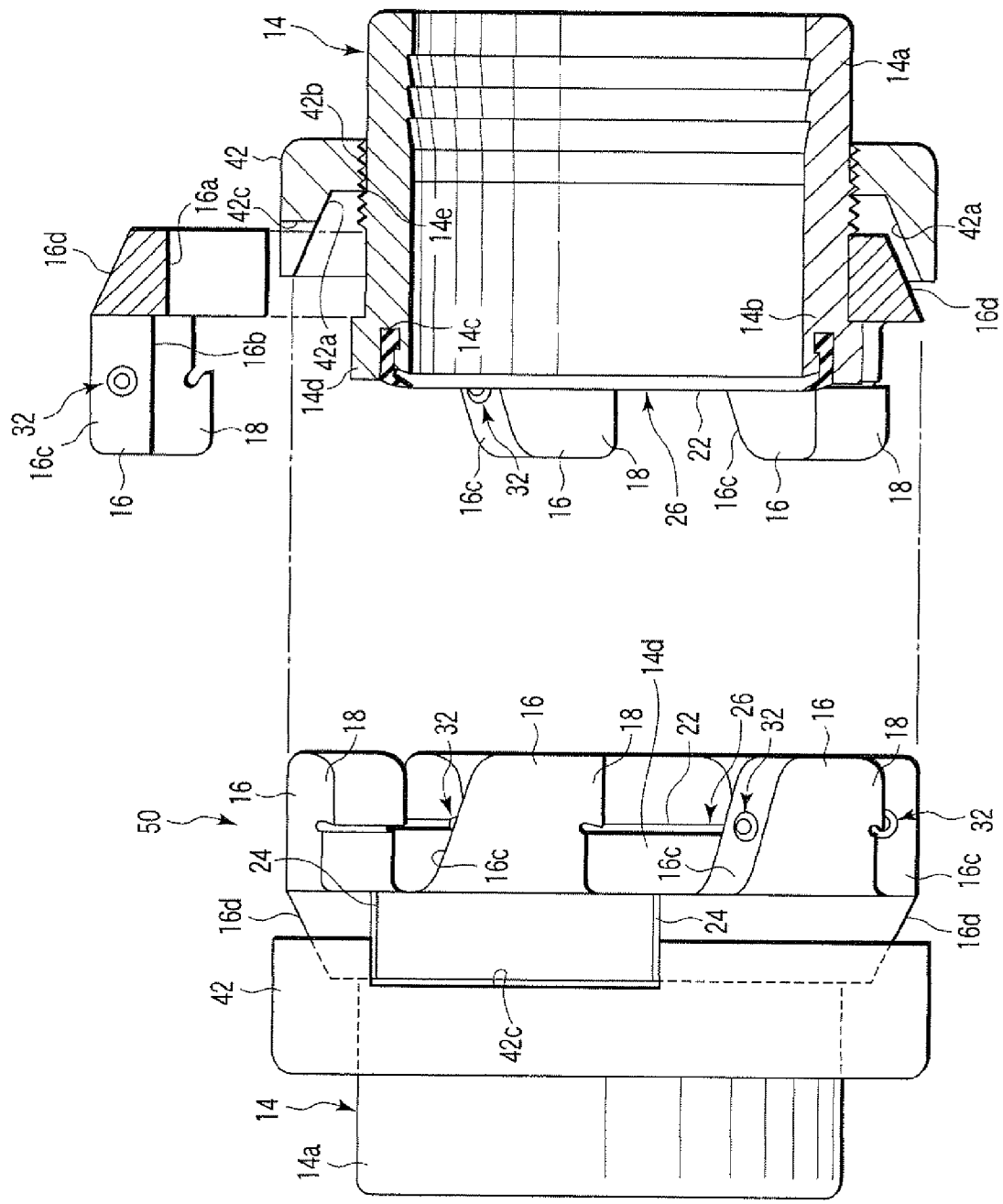
FIG. 12 is a side view schematically showing a state in which a part of plural fitting projections is separated from a predetermined position on an outer periphery of a distal end part of each of coupling bodies of the two coupling apparatuses of FIG. 10.

In FIG. 10 and FIG. 12, the entire configuration of the coupling apparatus 50 according to the third embodiment of this invention is shown. FIG. 10 is a perspective view schematically showing two of the coupling apparatus 50 according to the fourth embodiment of this invention in a state that the two coupling apparatuses 50 are separated from each other, and FIG. 11 is a side view schematically showing the two coupling apparatuses 50 of FIG. 10 with one of the two coupling apparatuses 50 being in a cross section.

Most part of the component members of the coupling apparatus 50 according to the fourth embodiment is the same as that of the coupling apparatus 40 according to the third embodiment described above with reference to FIGS. 7 to 9. Accordingly, in the coupling apparatus 50 according to the fourth embodiment of the present invention and described below with reference to FIGS. 10 to 12, the component members corresponding to those in the coupling apparatus 40 according to the third embodiment of the present invention and described above with reference to FIGS. 7 to 9 are indicated by the same reference numbers as those indicating the corresponding ones in the coupling apparatus 40 according to the third embodiment of the present invention and described above with reference to FIGS. 7 to 9, and detailed explanations thereof are omitted.

The difference in structure of the coupling apparatus 50 according to the fourth embodiment from the coupling apparatus 40 according to the third embodiment is as follows.

i. the planar shape of each of the plural fitting projections 16;

ii. an urging mechanism 32 is provided on a side surface 16c of the fitting projection 16 opposite to a side surface thereof from which the engaging hook 18 projects;

iii. a block has only one fitting projection 16 as the predetermined number of the fitting projection.

As described in the first embodiment, each block may have more than one fitting projection 16.

Such a fitting projection 16 having the urging mechanism 32 on its side face 16c is used in the coupling apparatus 30 according to the second embodiment described above with reference to FIGS. 4 to 6.

Taking all the foregoing features into consideration, the coupling apparatus 50 according to the fourth embodiment shown in FIGS. 10 to 13 are configured by replacing the fitting projection 16 of the coupling apparatus 40 according to the third embodiment described above with reference to FIGS. 7 to 9, with the fitting protection 16 having the urging mechanism 32 on its side face 16c in the coupling apparatus 30 according to the second embodiment described above with reference to FIGS. 4 to 6.

Accordingly, in addition to the various technical advantages obtained by the coupling apparatus 40 according to the third embodiment, the coupling apparatus 50 according to the fourth embodiment can enjoy the various technical advantages obtained by the fitting projection 16 having the urging mechanism 32 on its side face 16c in the coupling apparatus 30 according to the second embodiment.

The two coupling apparatuses 50, each of which is configured as described above and which is according to the fourth embodiment, may be coupled with or separated from each other in the same manner as that in the two coupling apparatuses 40 of the third embodiment described above with reference to FIGS. 7 to 9, in other words, as that in the two coupling apparatuses 10 of the first embodiment described above with reference to FIGS. 1 to 3.

When the two coupling apparatuses 50, 50 are detachably coupled with each other, the urging mechanism 32 acts in a manner as described below (see FIG. 6). When the two coupling apparatuses 50, 50 coaxially approach each other until the fitting projections 16 of the one coupling apparatus 50 fit into the fitting recesses between the fitting projections 16 of the other coupling apparatus 50, the ball-shaped pressing member 32b of the urging mechanism 32 of the other side surface 16c of each fitting projection 16 of the one coupling apparatus 50 and the ball-shaped pressing member 32b of the urging mechanism 32 of the other side surface 16c of each fitting projection 16 of the other coupling apparatus 50 come into contact with each other so that each ball-shaped pressing member 32b moves inward in the respective cup-shaped receptacle 32a against the urging force of the urging member 32c corresponding thereto.

When the fitting of the fitting projections 16 of the one coupling apparatus 50 into the fitting recesses between the fitting projections 16 of the other coupling apparatus 50 becomes more deeper and the engaging surface 18a of the engaging hook 18 of each fitting projection 16 of the one coupling apparatus 50 approaches the base end of each fitting projection 16 of the other coupling apparatus 50 beyond the engaging surface 18a of the engaging hook 18 of each fitting projection 16 of the other coupling apparatus 50, the urging force of the urging member 32c of the urging mechanism 32 on the other side surface 16d of each fitting projection 16 of the one coupling apparatus 50 and the urging force of the urging member 32c of the urging mechanism 32 on the other side surface 16d of each fitting projection 16 of the other coupling apparatus 50 operate to move each fitting projection 16 of the one coupling apparatus 50, together with the coupling boy 14 thereof, in a predetermined circumferential direction and to move each fitting projection 16 of the other coupling apparatus 30, together with the coupling boy 14 thereof, in a predetermined circumferential direction, through the ball-shaped pressing members 32b being kept in contact with each other as described above, so that the engaging hooks 18 of the fitting projections 16 of the one coupling apparatus 50 and those of the other coupling apparatus 50 approach each other more closely. As a result, the engaging hooks 18 of the fitting projections 16 of the one coupling apparatus 50 engage with the engaging hooks 18 of the fitting projections 16 of the other coupling apparatus 50 are engaged with each other as shown in FIG. 6, thus, the two coupling apparatuses 50 are detachably connected together.

At this time, the elastic members 22 on the end surfaces of the distal end parts 14b of the coupling bodies 14 of the two coupling apparatuses 50, 50 are pressed against each other to urge the coupling bodies 14 of the two coupling apparatuses 50, 50 away from each other in their axial direction, and thus the friction force generated between the locking surface 18a of the engaging hook 18 of each fitting projection 16 of the one coupling apparatus 50 and the locking surface 18a of the engaging hook 18 of each fitting projection 16 of the other coupling apparatus 50 is increased.

In addition to this, like the above described urging by the elastic bodies 22, the urging force of the urging member 32c of the urging mechanism 32 of the other side surface 16d of each fitting projection 16 of the one coupling apparatus 50 and the urging force of the urging member 32c of the urging mechanism 32 of the other side surface 16d of each fitting projection 16 of the other coupling apparatus 50 further increase the friction force generated between the engaging surface 18a of the engaging hook 18 of each fitting projection 16 of the one coupling apparatus 50 and the engaging surface 18a of the engaging hook 18 of each fitting projection 16 of the other coupling apparatus 50, through the ball-shaped pressing members 32 being kept in contact with each other as described above.

In the case where the block having the damaged fitting projection 16 or damaged engaging hook is replaced with a new block, at first the fixation of the fixing structure 42 to the outer periphery of the distal end part 14b of the coupling body 14 is released, and then the fixing structure 42 is moved on the outer periphery of the distal end part 14b of the coupling body 14 in the axial direction of the coupling body 14 until the inner end of the cutout 42c is moved away from the end surface of the distal end part 14b of the coupling body 14 beyond the base end surfaces of the plural blocks, that is the plural fitting projections 16, placed on the plural circumferential positions of the outer periphery of the distal end part 14b of the coupling body 14, as shown in FIG. 12. Further, the position of the fixing structure 42 relative to the outer periphery of the distal end part 14b of the coupling body 14 in the circumferential direction is adjusted to locate the both circumferential ends of the block to be replaced within a range between the both circumferential ends of the cutout 42c.

As a result, the outward tapering surface 16d of the block to be replaced is exposed completely within the range of the cutout 42c of the fixing structure 42, so that the block to be replaced can be separated from the circumferential position on the outer periphery of the distal end part 14b of the coupling body 14 through the cutout 42c, as shown in FIG. 12, and then the new block can be placed on the cleared circumferential position on the outer periphery of the distal end part 14b of the coupling body 14 through the cutout 42c.

During this time, other blocks on the outer periphery of the distal end part 14b of the coupling body 14 are prevented from separating therefrom since the base end side parts of their outward tapering surfaces 16d are covered with the projecting end side part of the inward tapering surface 42a of the fixing structure 42 excluding the portion corresponding to the cutout 42c.

A pressure-deformable member 24 is interposed between each of the circumferential ends of the new block and the new block side circumferential end of each of the two blocks located adjacent to the new block on the outer periphery of the distal end part 14h of the coupling body 14.

Thereafter, the fixing structure 42 is moved on the outer periphery of the distal end part 14b of the coupling body 14 in a direction approaching the end surface of the distal end part 14b of the coupling body 14, that is in a direction approaching the projecting end parts of the plural fitting projections 16 of the plural blocks, until the inward tapering surface 42a of the fixing structure 42 fits on the outward tapering surfaces 16d of the plural blocks placed on the plural circumferential positions of the outer periphery of the distal end part 14b of the coupling body 14. As a result, the plural blocks, that is the plural fitting projections 16, are held between the fixing structure 42 and the outward overhang 14d of the outer periphery of the distal end part 14b of the coupling body 14 in the axial direction, so that the plural blocks, that is the plural fitting projections 16, can be detachably fixed on the plural circumferential positions of the outer periphery of the distal end part 14b of the coupling body 14 by the fixing structure 42.

That is, in the coupling apparatus 50 of this embodiment, the operation for replacing the block having the damaged fitting projection 16 or damaged engaging hook 18 with a new block is easy.

[First Modification]

FIG. 13A shows a fitting projection 16" according to a first modification of the fitting projection 16 used in each of the coupling apparatuses 20, 30, 40, and 50 of the first to fourth embodiments described above.

The fitting projection 16" is formed with a key-shaped part preventing the engaging hooks 18 of the fitting projections 16" of the one coupling apparatus from engaging with the engaging hooks 18 of the fitting projections 16" of the other coupling apparatus when the two coupling apparatuses are coaxially approached each other and the fitting projections 16" of the one coupling apparatus fit the fitting recesses between the fitting projections 16" of the other coupling apparatus and then the coupling body 14 of the one coupling apparatus is rotated relative to the coupling body 14 of the other coupling apparatus in the predetermined circumferential direction, excluding in a case in which the two coupling apparatuses have the same shape with the same dimensions as to each other.

The key-shaped part 16e is configured by a combination of a projection and a groove both of which are formed at predetermined positions on both sides of the engaging hook 18 in the projecting direction of the fitting projection 16" on the circumferential side surface of the fitting projection 16", on which the engaging hook 18 is formed. Specifically, the groove is formed in the predetermined position outside of the engaging hook 18 in the projecting direction, and the projection is formed in the predetermined position inside of the engaging hook 18 in the projecting direction.

If the circumferential side surface of the fitting projection 16, on which the engaging hook 18 is formed but the key-shaped part 16e is not formed, is moved along the circumferential side surface of the fitting projection 16", which is according to the first modification and on which the engaging hook 18 is formed, toward the base end of the fitting projection 16" of the first modification, as shown in FIG. 13A, the engaging hook 18 of the fitting projection 16" of the first modification and the engaging hook 18 of the fitting projection 16 not formed with the key-shaped part 16e only face each other and are prevented from engaging with each other by the key-shaped part 16e of the fitting projection 16", as shown in FIG. 13B.

Figure 14A:
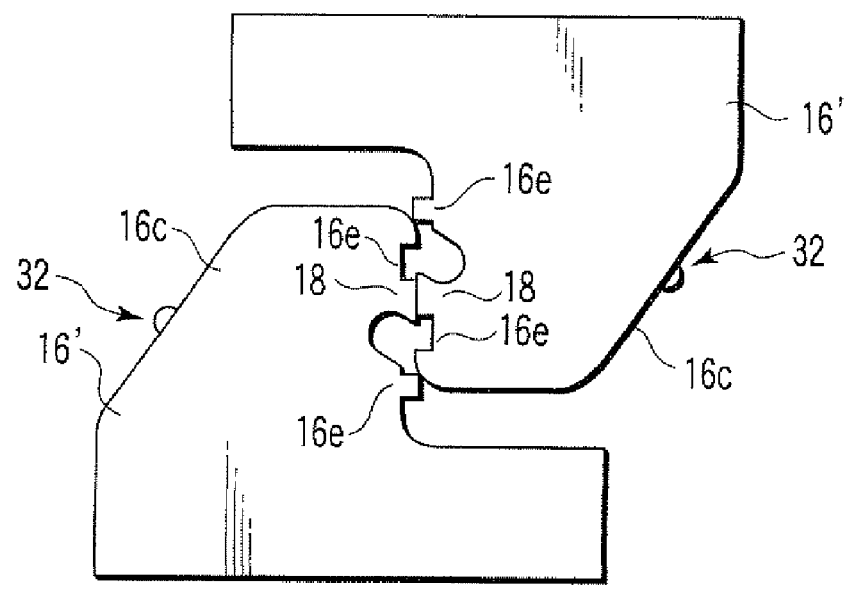
FIG. 14A is a schematic plan view showing a state in which the two fitting projections according to the first modification are close to each other in an axial direction.
Figure 14B:
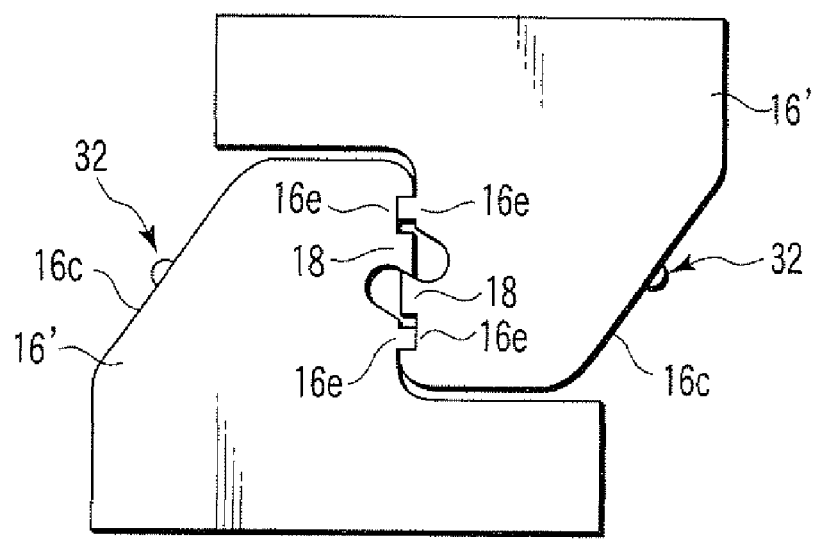
FIG. 14B is a schematic plan view showing a state in which the two fitting projections according to the first modification are rotated in one circumferential direction to be connected with each other after these fitting projections are close to each other in FIG. 14A.

If the circumferential side surface of the fitting projection 16", which is according to the first modification and on which the engaging hook 18 is formed, is moved along the circumferential side surface of another fitting protection 16", which is also according to the first modification and on which the engaging hook 18 is also formed, toward the base end of the latter fitting projection 16" of the first modification, as shown in FIG. 14A, the key-shaped parts 16e of the two fitting projections 16" are matched with each other so that the engaging hook 18 of the fitting projection 16" of the first modification and the engaging hook 18 of the fitting projection 16" of the other first modification are allowed to engage with each other.

[Second Modification]

FIG. 15A shows a fitting projection 16" according to a second modification of the fitting projection 16 used in each of the coupling apparatuses 20, 30, 40, and 50 of the first to fourth embodiments described above.

The fitting projection 16" according to the second modification further includes a friction increasing mechanism 60 which presses the coupling bodies 14 of the two coupling apparatuses to move them away from each other in the axial direction when the two coupling apparatuses are coupled with each other, so that the friction force generated between the engaging hooks 18 of the fitting projections 16" of the one coupling apparatus and the engaging hooks 18 of the fitting projections 16" of the other coupling apparatus increases.

The friction increasing mechanism 60 includes a pressing member 60b which is accommodated in a hole 60a extending from the end surface of the fitting projection 16" toward its base end, and which is slidable in the longitudinal direction of the hole 60a. A guide groove 60c formed in the outer periphery of the fitting projection 16" communicates with the hole 60a. The guide groove 60c has a longitudinally extending part extending along the longitudinal direction of the hole 60a, and a bend part bending sideway relative to the longitudinal direction of the hole 60a at a projecting-end-surface near end located near to the projecting end surface of the fitting projection 16" in the longitudinally extending part. An operating part 60d fixed to the pressing member 60b is inserted in the guide groove 60c. The operating part 60d is movable between a projecting-end-surface distal end which is located away from the projecting end surface of the fitting projection 16" in the longitudinally extending part of the guide groove 60c, and the bend part which is located near to the projecting-end-surface near end. When the operating part 60d is positioned at the projecting-end-surface distal end of the longitudinally extending part of the guide groove 60c, the pressing member 60b is retracted in the hole 60a and does not project out from the projecting end surface of the fitting projection 16", as shown in FIG. 15A. Conversely, when the operating part 60d is located in the bend part at the projecting-end-surface near end of the longitudinally extending part of the guide groove 60c, the pressing member 60b projects out from the projecting end surface of the fitting projection 16" by a predetermined distance, as shown in FIG. 15B.

While the operating part 60d is located in the projecting-end-surface distal end of the longitudinally extending part of the guide groove 60c and the pressing member 60b is retracted in the hole 60b not to project out from the projecting end surface of the fitting projection 16", as shown in FIG. 15A, the two coupling apparatuses can be coupled with or separated from each other.

When the operating part 60d is moved to the bend part of the projection-end-surface near end of the longitudinally extending part of the guide groove 60c to project out the pressing member 60b from the projecting end surface of the fitting projection 16" by the predetermined distance after the coupling apparatus having at least one fitting projection 16" according to the second modification is connected to a coupling apparatus having no fitting projection 16", as shown in FIG. 15B, the projecting end of the pressing member 60b presses the counter end surface of the base end part of the fitting projection 16 of the coupling apparatus corresponding thereto. As a result, the coupling bodies 14 of the two coupling apparatuses coupled with each other are pressed to move away from each other in the axial direction, so that friction force generated between the engaging hooks 18 of the fitting projections 16 of the one coupling apparatus and the engaging hooks 18 of the fitting projections 16 of the other coupling apparatus.

It is enough that at least one fitting projection 16" according to the second modification is provided on at least one of the two coupling apparatuses to be connected. Alternatively, each of the two coupling apparatuses to be connected may have at least one fitting projection 16".

[Third Modification]

Figure 16A:
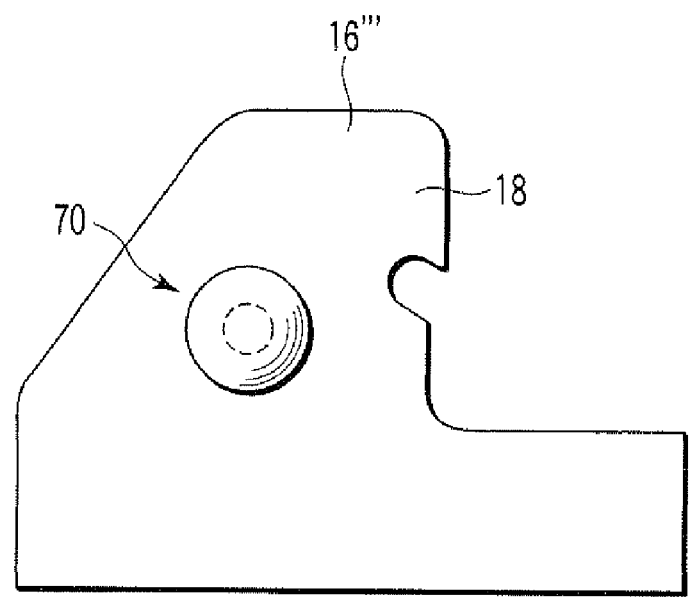
FIG. 16A is a schematic plan view of a fitting projection according to a third modification.
Figure 16B:
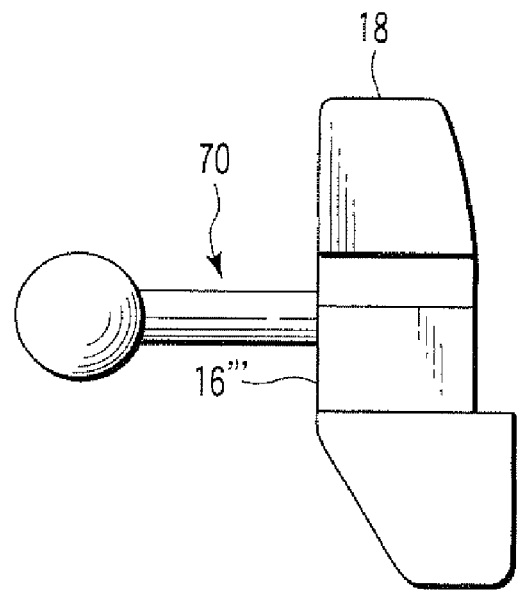
FIG. 16B is a schematic right side view of the fitting projection according to the third modification of FIG. 16A.

FIGS. 16A and 16B show a fitting projection 16''' according to a third modification of the fitting projection 16 used in each of the coupling apparatuses 20, 30, 40, and 50 of the first to fourth embodiments described above. A handle 70 is fixed to an outer periphery of the fitting projection 16''' according to the third modification. The handle 70 facilitates the attachment and detachment of the fitting projection 16''' according to the third modification to the coupling body 14 of the coupling apparatus 20, 30, 40, or 50 corresponding thereto. The handle 70 may be detachably fixed to the outer periphery of the fitting projection 16''' according to the third modification by a known detachable fixing structure such as screwing or the like. Accordingly, only when the fitting projection 16''' according to the third modification is attached to or detached from the coupling body 14 of the coupling apparatus 20, 30, 40, or 50 corresponding thereto, the handle 70 is fixed to the outer periphery of the fixing projection 16''' according to the third modification, thereby facilitating the attachment and detachment of the fitting projection 16'''. Then, after the fitting projection 16''' according to the third modification is fixed to the coupling body 14 of the coupling apparatus 20, 30, 40, or 50 corresponding thereto by the fixing structure 20 or 42, the handle 70 is removed from the outer periphery of the fitting projection 16''' according to the third modification, so that the handle 70 does not make the handling of the coupling apparatus 20, 30, 40, or 50 being troublesome.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coupling apparatus comprising:
   an annular coupling body having a proximal end part attached to a predetermined part of an object to be connected and a distal end part positioned opposite the proximal end part;
   plural fitting projections projecting along an axial direction of the coupling body from plural predetermined circumferential positions on the distal end part of the coupling body, each fitting projection having an engaging hook projecting in one predetermined circumferential direction at a projecting end part thereof, and the plural fitting projections being formed in plural blocks, each having the predetermined number of fitting projections and being independent of the coupling body; and
   a fixing structure which is independent of the coupling body and the projection blocks and which detachably fixes the projection blocks to the predetermined circumferential positions on the distal end part of the coupling body, the fixing structure including insert connection members each of which has a bolt with a head, which is inserted in a through hole formed in at least one of the coupling body and each block and which is detachably connected to the other,
   wherein the coupling apparatus is structured such that two of the coupling apparatuses approach each other coaxially to fit the fitting projections of one coupling apparatus into fitting recesses between the fitting projections of the other coupling apparatus, and subsequently, the coupling body of the one coupling apparatus is rotated in a predetermined circumferential direction relative to the coupling body of the other coupling apparatus to make the engaging hooks of the fitting projections of the one coupling apparatus engage with the engaging hooks of the fitting projections of the other coupling apparatus, thus detachably connecting the two coupling apparatuses to each other.

2. The coupling apparatus according to claim 1, further comprising an urging mechanism which is disposed on a side opposite to the engaging hook on at least one of the plural fitting projections and which urges another coupling apparatus in the predetermined circumferential direction when the two coupling apparatuses are coupled to each other.

3. The coupling apparatus according to claim 1, further comprising a friction increasing mechanism which urges the coupling bodies of the two coupling apparatuses to make the coupling bodies move away from each other along the axial direction when the two coupling apparatuses are coupled to each other and which increases friction force generated between the engaging hooks of the fitting projections of the one coupling apparatus and the engaging hooks of the fitting projections of the other coupling apparatus.

4. The coupling apparatus according to claim 3, wherein the friction increasing mechanism includes an elastic member disposed on an end surface of the distal end part of each of the coupling bodies of the two coupling apparatuses, and, when the two coupling apparatuses are coupled to each other, the elastic members on the end surfaces of the distal end parts of the coupling bodies of the two coupling apparatuses elastically press each other to make the coupling bodies move away from each other along the axial direction and to increase the friction force generated between the engaging hooks of the fitting projections of the one coupling apparatus and the engaging hooks of the fitting projections of the other coupling apparatus.

5. The coupling apparatus according to claim 1, wherein at least one of the objects connected to the coupling bodies of the two coupling apparatuses is a flexible hose for flowing fluid.

6. The coupling apparatus according to claim 1, wherein at least one of the objects connected to the coupling bodies of the two coupling apparatuses is one of a pipe and a solid member.

7. The coupling apparatus according to claim 1, wherein an operation handle is provided on at least one of the plural fitting projections.

8. The coupling apparatus according to claim 1, wherein a key-shaped part is formed on at least one of the fitting projections, the key-shaped part allowing the engaging hooks of the fitting projections of the one coupling apparatus to engage with the engaging hooks of the fitting projections of the other coupling apparatus when the two coupling apparatuses are arranged coaxially and approach each other, and the fitting projections of the one coupling apparatus fit the fitting recesses between the fitting projections of the other coupling apparatus, and the coupling body of the one coupling apparatus is subsequently rotated relative to the coupling body of the other coupling apparatus in the predetermined circumferential direction, only in a case in which the two coupling apparatuses have the same shape and the same dimensions as each other.

9. A coupling apparatus comprising:
   an annular coupling body having a proximal end part attached to a predetermined part of an object to be connected and a distal end part positioned opposite the proximal end part;
   plural fitting projections projecting along an axial direction of the coupling body from plural predetermined circumferential positions on the distal end part of the coupling body, each fitting projection having an engaging hook projecting in one predetermined circumferential direction at a projecting end part thereof, and the plural fitting projections being formed independently of the coupling body;

a fixing structure which is independent of the coupling body and the fitting projections and which detachably fixes the fitting projections to the predetermined circumferential positions on the distal end part of the coupling body: and an outward overhang provided on the outer periphery of the distal end part of the coupling body adjacent to an end surface of the distal end part to project outward in a radial direction of the coupling body, each fitting projection having an inner periphery placed on a part of the outer periphery of the distal end part of the coupling body, the part being adjacent to the outward overhang in a side opposite to the end surface, and an outward tapering surface inclining toward the inner periphery with the outward tapering surface extending away from the projecting end part in the axial direction, after placing the inner peripheries of the plural fitting projections on the outer periphery of the distal end part of the coupling body to be adjacent to the outward overhang, the fixing structure being detachably fixed on a part of the outer periphery of the distal end part of the coupling body, the part being in a side of the outward overhang opposite to the plural fitting projections along the axial direction, and the fixing structure having an inward tapering surface which fits the outward tapering surfaces of the plural fitting projections to fix the plural fitting projections coaxially on the predetermined positions of the outer periphery of the distal end part of the coupling body, and the fixing structure having a cutout exposing at least one outward tapering surface of the plural fitting projections the inner peripheries of which are placed on the outer periphery of the distal end part of the coupling body adjacent to the outward overhang, the cutout allowing at least one fitting projection the outward tapering surface of which is exposed in the cutout, to be approached to or separated from the position on the outer periphery of the distal end part of the coupling body adjacent to the outward overhang through the cutout, wherein two of the coupling apparatuses approach coaxially to each other to fit the fitting projections of one coupling apparatus into fitting recesses between the fitting projections of the other coupling apparatus, next, the coupling body of the one coupling apparatus is rotated in a predetermined circumferential direction relative to the coupling body of the other coupling apparatus to make the engaging hooks of the fitting projections of the one coupling apparatus engage with the engaging hooks of the fitting projections of the other coupling apparatus, thus detachably connecting the two coupling apparatuses each other.

10. The coupling apparatus according to claim 9, further comprising an urging mechanism which is disposed on a side opposite to the engaging hook on at least one of the plural fitting projections and which urges another coupling apparatus in the predetermined circumferential direction when the two coupling apparatuses are coupled to each other.

11. The coupling apparatus according to claim 9, further comprising a friction increasing mechanism which urges the coupling bodies of the two coupling apparatuses to make the coupling bodies move away from each other along the axial direction when the two coupling apparatuses are coupled to each other and which increases friction force generated between the engaging hooks of the fitting projections of the one coupling apparatus and the engaging hooks of the fitting projections of the other coupling apparatus.

12. The coupling apparatus according to claim 11, wherein the friction increasing mechanism includes an elastic member disposed on an end surface of the distal end part of each of the coupling bodies of the two coupling apparatuses, and, when the two coupling apparatuses are coupled to each other, the elastic members on the end surfaces of the coupling bodies of the two coupling apparatuses elastically press each other to make the coupling bodies move away from each other along the axial direction and to increase the friction force generated between the engaging hooks of the fitting projections of the one coupling apparatus and the engaging hooks of the fitting projections of the other coupling apparatus.

13. The coupling apparatus according to claim 9, wherein at least one of the objects connected to the coupling bodies of the two coupling apparatuses is a flexible hose for flowing fluid.

14. The coupling apparatus according to claim 9, wherein at least one of the objects connected to the coupling bodies of the two coupling apparatuses is one of a pipe and a solid member.

15. The coupling apparatus according to claim 9, wherein the plural fitting projections are formed in plural blocks, each having the predetermined number of fitting projections, the plural blocks are placed on the predetermined positions on the outer periphery of the distal end part of the coupling body while pressure deformable members which are deformed when being applied with pressure are sandwiched between the plural blocks in the circumferential direction, and the cutout of the fixing structure exposes at least one outward tapering surface of the blocks the inner peripheries of which are placed on the outer periphery of the distal end part of the coupling body adjacent to the outward overhang, the cutout allowing the at least one block the outward tapering surface of which is exposed in the cutout, to be approached to or separated from the position on the outer periphery of the distal end part of the coupling body adjacent to the outward overhang through the cutout.

16. The coupling apparatus according to claim 9, wherein an operation handle is provided on at least one of the plural fitting projections.

17. The coupling apparatus according to claim 9, wherein a key-shaped part is formed on at least one of the fitting projections, the key-shaped part allowing the engaging hooks of the fitting projections of the one coupling apparatus to engage with the engaging hooks of the fitting projections of the other coupling apparatus when the two coupling apparatuses are arranged coaxially and approach each other, and the fitting projections of the one coupling apparatus fit the fitting recesses between the fitting projections of the other coupling apparatus, and the coupling body of the one coupling apparatus is subsequently rotated relative to the coupling body of the other coupling apparatus in the predetermined circumferential direction, only in a case in which the two coupling apparatuses have the same shape and the same dimensions as each other.

* * * * *